(12) United States Patent
Hada et al.

(10) Patent No.: US 6,547,344 B2
(45) Date of Patent: Apr. 15, 2003

(54) BRAKING APPARATUS FOR VEHICLES

(75) Inventors: Satoshi Hada, Saitama (JP); Keisuke Katsuta, Saitama (JP); Hirohiko Totsuka, Saitama (JP); Shohei Matsuda, Saitama (JP); Tetsuro Yamaguchi, Saitama (JP); Kazuaki Fukami, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 30 days.

(21) Appl. No.: 09/879,089

(22) Filed: Jun. 13, 2001

(65) Prior Publication Data

US 2002/0021045 A1 Feb. 21, 2002

(30) Foreign Application Priority Data

Jun. 13, 2000 (JP) ........................................ 2000-176319

(51) Int. Cl.$^7$ ................................................ B60T 8/32
(52) U.S. Cl. ........................ 303/191; 303/192; 303/187; 188/DIG. 2
(58) Field of Search ............................... 303/113.1, 191, 303/119.1, 192, 187, 89; 188/DIG. 2, 353

(56) References Cited

U.S. PATENT DOCUMENTS

| 4,717,207 | A | * | 1/1988 | Kubota et al. ................. 303/3 |
| 5,984,429 | A | * | 11/1999 | Nell et al. ................. 303/113.4 |
| 6,193,332 | B1 | * | 2/2001 | Ono ........................... 303/191 |
| 6,332,654 | B1 | * | 12/2001 | Yano ........................... 303/89 |
| 6,415,897 | B1 | * | 7/2002 | Sugimoto et al. ........... 188/353 |

FOREIGN PATENT DOCUMENTS

JP      2000-190828      7/2000      ............. B60T/7/12

* cited by examiner

Primary Examiner—Matthew C. Graham
Assistant Examiner—Mariano Sy
(74) Attorney, Agent, or Firm—Sughrue Mion, PLLC

(57) ABSTRACT

A braking apparatus for vehicles BU, in which plurality systems of individually separated brake fluid pressure passages BC(A), BC(B) are arranged, and each passage is provided with at least one brake fluid pressure retaining means RU(A), RU(B) for continuously retaining brake fluid pressure within a wheel cylinder WC(A), WC(B) arranged in the brake fluid pressure passage after a depression of a brake pedal BP is released and for releasing the retained brake fluid pressure in response to an increase of a starting driving force of the vehicle, wherein the release of the retained brake fluid pressure is carried out in a time differential manner at each brake fluid pressure retaining means.

20 Claims, 12 Drawing Sheets

Change of Brake fluid pressure
(Braking force)

Change of Brake fluid pressure
(Braking force)

BRAKING APPARATUS FOR VEHICLES

FIELD OF THE INVENTION

The present invention relates to a braking apparatus for vehicles, which is equipped with a brake fluid pressure retaining means for continuously retaining brake fluid pressure after a release of a brake pedal.

BACKGROUND OF THE INVENTION

Various braking apparatus for vehicles are known, which are equipped with a braking force retaining means or a brake fluid pressure retaining means for continuously acting a braking force after a release of a brake pedal. For example, the applicants disclose a brake fluid pressure retaining unit or a braking apparatus for vehicles in Japanese Patent Application No. Hei-10-370249 (unpublished), in which two systems of brake fluid pressure passages are provided, and each of the brake fluid pressure passages is equipped with a solenoid valve and a brake fluid pressure reduction speed control means for retaining reduction speed of the brake fluid pressure within a wheel cylinder less than that of the brake pedal load applied by a driver. In this braking apparatus, the brake fluid pressure is retained within the wheel cylinder after a release of the brake pedal for continuously acting a braking force, and thereby a smooth and reliable starting operation on a slope can be achieved without undesirably rolling down the slope.

However, in the prior art braking apparatus, the retained brake fluid pressure is released at a time, and so the braking force is immediately reduced to zero at the time of the release, which leads to a sudden start of the vehicle. The driver feels this sudden feel as a sudden impact or brake dragging. This is more prominent on a down slope because the vehicle's own weight also affects the driving force of the vehicle. Further, if the braking force is immediately reduced to zero at the release of the brake, slippage or idle spin of the driving wheels occurs upon starting the vehicle on a slippery road with a small coefficient of frictional resistance ($\mu$), such as a snowy road or icy road, due to the relation between the braking force and the driving force. Therefore, the driver cannot perform a smooth start of the vehicle.

In view of the above, the main object of the present invention is to provide a braking apparatus for vehicles, which ensures a smooth start of the vehicle without any sudden feels at the start.

SUMMARY OF THE INVENTION

In order to solve the above objective, the inventors made considerable research and development works and finally completed the present invention in consideration of the fact that the brake fluid pressure passage of the vehicle is separated into a plurality of individual passages and that in the conventional braking apparatus the retained brake fluid pressure is released simultaneously in all wheel cylinders. According to the present invention, there is provided a braking apparatus for vehicles, in which plurality systems of individually separated brake fluid pressure passages are arranged, and each passage is provided with at least one brake fluid pressure retaining means for continuously retaining brake fluid pressure within a wheel cylinder arranged in the brake fluid pressure passage after a depression of a brake pedal is released and for releasing the retained brake fluid pressure in response to an increase of a starting driving force of the vehicle, wherein the release of the retained brake fluid pressure is carried out in a time differential manner at each brake fluid pressure retaining means.

In such a construction, even if a depression of the brake pedal is released, the brake fluid pressure retaining means continuously retains the brake fluid pressure within the wheel cylinder. As a result, when the vehicle stops on a slope, the driver can start the vehicle without undesirable backward displacement of the vehicle. The retained brake fluid pressure is released in response to an increase of the starting driving force.

Further, in this braking apparatus for vehicles, the brake fluid pressure passage is separated into plurality systems, and each wheel is equipped with a wheel cylinder. Therefore, brake fluid pressure retaining means may be provided in each system of the plurality brake fluid pressure passages. Alternatively, the brake fluid pressure retaining means may be provided at each wheel cylinder. Additionally, the brake fluid pressure retained by these brake fluid pressure retaining means is released in a time differential manner. That is, in response to an increase of the starting driving force of the vehicle, the retained brake fluid pressure is released at each system of the brake fluid pressure passages or at each wheel cylinder with a time lag between one system and the others or one wheel cylinder and the others. For this reason, the retained brake fluid pressure is not released at one time, and so a release of the braking force is smoothly carried out.

In a four-wheel vehicle where the brake fluid pressure passage is separated into two individual systems and each brake fluid pressure passage of the system is further divided and connected to two wheel cylinders, brake fluid pressure retaining means are preferably provided in the following manner. This is because the release of the brake fluid pressure can be performed with a time lag and redundant arrangement of equipment can be eliminated.

(a) One brake fluid pressure retaining means is provided at each brake fluid pressure passage of the two systems, preferably at a point before the brake fluid pressure passage is divided.

(b) One brake fluid pressure retaining means is provided at respective wheel cylinders, and at least two wheel cylinders out of four wheel cylinders are equipped with the brake fluid pressure retaining means. The brake fluid pressure retaining means is provided in the brake fluid pressure passage at a point after the brake fluid pressure passage is divided, viz. close to the wheel cylinder.

(c) In the case that a brake fluid pressure retaining means is provided in one system of the brake fluid pressure passage out of two systems at a point before the brake fluid pressure passage is divided, a brake fluid pressure retaining means is provided in the other system of the brake fluid pressure passage at least at a point after the brake fluid pressure passage is divided, viz. close to the wheel cylinder.

Herein, the wording "an increase of a starting driving force of the vehicle" includes, but is not limited to, a case where no starting driving force has arisen, a case where a sufficient starting driving force has not arisen to prevent the vehicle from undesirably rolling down a slope, and a case where a starting driving force has increased to such an extent that the vehicle can start on a slope without undesirable backward displacement. The increase of the starting driving force may be determined by directly measuring a driving torque of the driving wheel, however, it can also be determined based on the following points:

(a) a point when the driver depresses the accelerator pedal, in case of a vehicle with an automatic transmission;

(b) a point when the driver depresses the accelerator pedal and connects the clutch, in case of a vehicle with a manual transmission; and (c) in case of a vehicle with an automatic transmission which automatically increases a driving force transmission capacity of the starting clutch, in response to a release of the brake pedal, to such an extent that the driving force of the vehicle increases until the vehicle withstands an undesirable backward displacement on a slope, a point when such an increase is achieved, for example a point when a creep driving force has arisen or a point when a strong creep condition is achieved as stated in the detailed description of the preferred embodiments.

Further, the wording "the release of the retained brake fluid pressure is carried out in a time differential manner" includes, but is not limited to, the following cases:

(a) a starting point of the release of the retained brake fluid pressure is different at each brake fluid pressure retaining means (the release of the brake fluid pressure may be completed at the same time with other brake fluid pressure retaining means); and (b) a starting point of the release of the retained brake fluid pressure is common in all the brake fluid pressure retaining means, and a finishing point of the release of the brake fluid pressure is different at each brake fluid pressure retaining means (for example, a release speed of the brake fluid pressure differs at each brake fluid pressure retaining means).

BRIEF DESCRIPTION OF THE DRAWINGS

Preferred embodiments of the present invention will be described below, by way of example only, with reference to the accompanying drawings, in which:

FIGS. 3A and 3B show release patterns of brake fluid pressure with the braking apparatus according to the present invention, in which FIG. 3A represents an instance that a starting point of the release of the brake fluid pressure is different at each brake fluid pressure retaining means, and FIG. 3B represents an instance that a release speed of the brake fluid pressure differs at each brake fluid pressure retaining means;

FIG. 4 shows the control logic of the braking apparatus for vehicles, in which

FIG. 5 shows control of a driving force control unit according to a preferred embodiment of the invention, in which

FIG. 7 shows the control logic of the brake fluid pressure retaining means, in which

FIG. 8 shows control of the driving force control unit, in which FIG. 8A shows a backward displacement detecting version of the vehicle, and FIG. 8B shows a vehicle movement detecting version;

FIG. 9 shows control of the driving motor stopping unit, in which FIG. 9A shows a backward displacement detecting version, and FIG. 9B shows a vehicle movement detecting version;

FIG. 10 shows a way of detecting backward displacement of the vehicle, in which

DESCRIPTION OF THE PREFERRED EMBODIMENT

With reference to the attached drawings, a braking apparatus for vehicles according to the present invention will be described.

Figure 1:
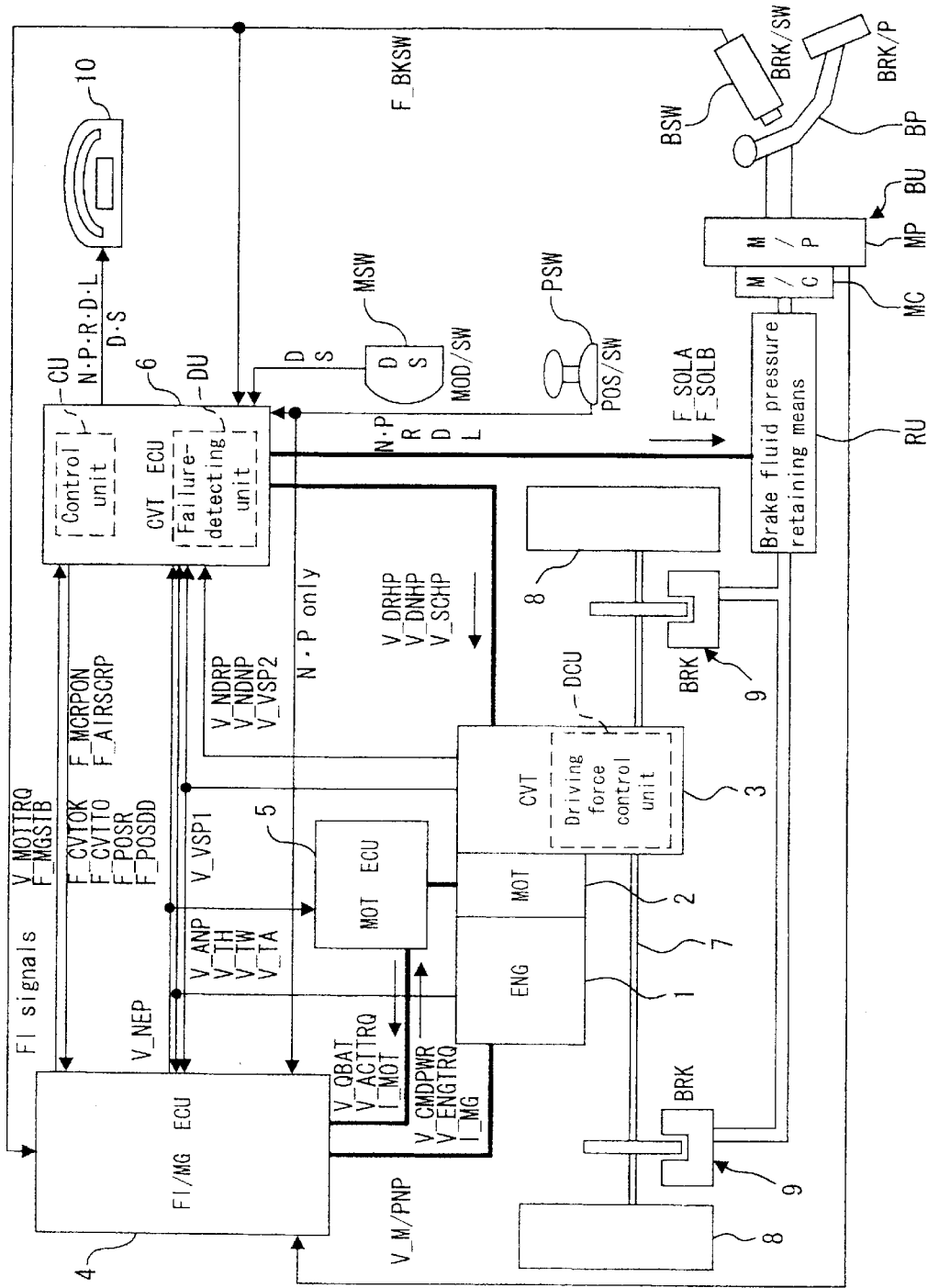
FIG. 1 shows a system configuration of a vehicle provided with a braking apparatus according to the present invention.
Figure 2:
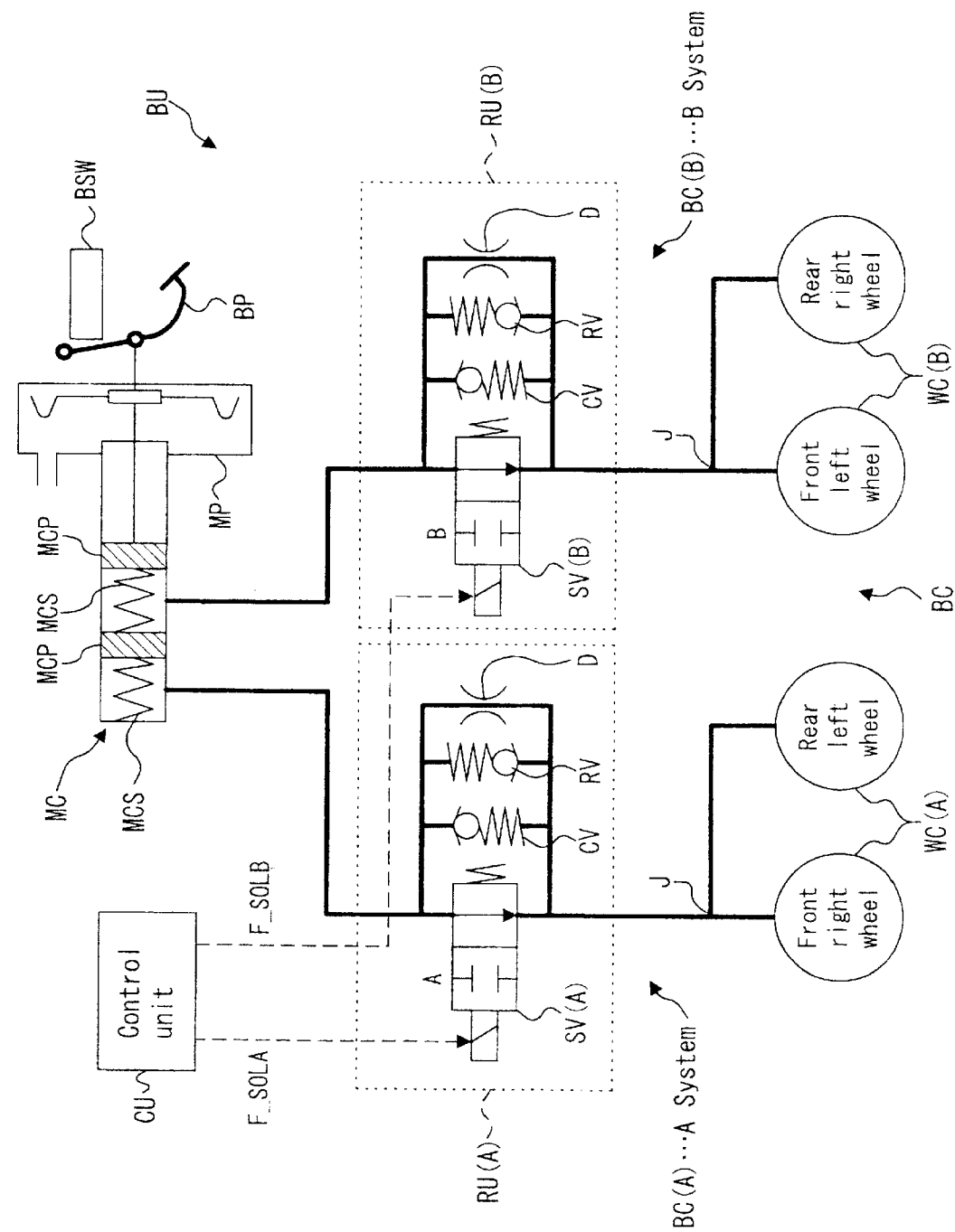
FIG. 2 shows a construction of the braking apparatus for vehicles.

As shown in FIGS. 1 and 2, a braking apparatus is mounted on a four-wheel vehicle equipped with a driving motor, and it is provided with a brake fluid pressure retaining means for continuously retaining brake fluid pressure within each wheel cylinder after a depression of a brake pedal is released and for releasing the retained brake fluid pressure of the wheel cylinder in response to an increase of a starting driving force of the vehicle. A brake fluid pressure passage is divided into two systems, viz. A system and B system, and each of the systems is equipped with one brake fluid pressure retaining means. Release of the retained brake fluid pressure is carried out in a time differential manner at each system. The vehicle is provided with a driving force control unit for switching a creep driving force between a strong condition and a weak condition in accordance with a depression of the brake pedal when the driving motor is idling and the vehicle speed is under a certain speed. In creep running, the vehicle with an automatic transmission moves slowly as if it creeps along the ground when the transmission is set to a running range, such as a D (Drive) or R (Reverse) range and the accelerator pedal is released (the driving motor is idling).

System Configuration of Vehicle and Others

The system configuration of a vehicle according to the present invention will be described with reference to FIG. 1. The vehicle shown in this embodiment is a hybrid type vehicle having an engine 1 and an electric motor 2 as a driving motor, and is provided with a belt-type continuously variable transmission 3 (hereinafter referred to as CVT 3). Engine 1 is an internal combustion engine operates on gasoline and the like, and electric motor 2 operates on electricity. The driving motor of the vehicle is not restricted merely to an engine or a motor. Similarly, the transmission is not restricted to a particular type. The transmission may be an automatic transmission having a torque converter or manual transmission.

Engine (Driving Motor), CVT (Transmission) and Motor(Driving Motor)

Engine 1 is controlled at a fuel injection electronic control unit (hereinafter referred to as FI ECU). The FI ECU is integrally constructed with a management electronic control unit (hereinafter referred to as MG ECU), and it is incorporated in a fuel injection/management electronic control unit 4 (hereinafter referred to as FI/MG ECU). Motor 2 is controlled at a motor electronic control unit 5 (hereinafter referred to as MOT ECU). Further, CVT 3 is controlled at a CVT electronic control unit 6 (hereinafter referred to as CVT ECU).

A drive axle 7 provided with two driving wheels 8, 8 is mounted to the CVT 3. Each driving wheel 8 is provided with a disc brake 9, which includes a wheel cylinder WC and the like (FIG. 2). The wheel cylinders WC of the disc brakes 9 are connected to a master cylinder MC through a brake fluid pressure retaining means RU. When the driver depresses the brake pedal BP, the brake pedal load generated is transmitted to the master cylinder MC through the master power MP. The brake switch BSW detects whether or not the brake pedal BP is depressed.

Engine 1 is an internal combustion engine which makes use of thermal energy. Engine 1 drives the two driving wheels 8 through CVT 3 and drive axle 7. In order to improve fuel consumption, engine 1 may be automatically stopped while the vehicle stops. For this reason, the vehicle is provided with a driving motor stopping unit for automatically stopping engine 1 when a certain automatic engine stop condition is satisfied.

Motor 2 has an assist mode for assisting the engine drive with the use of electric energy from a battery (not shown). Motor 2 has a regeneration mode for converting the kinetic energy derived from the rotation of drive axle 7 into electric energy. When the engine does not require an assist from the assist mode (such as for starting on a down slope or deceleration of the vehicle), the converted electric energy is stored in the battery. Further, motor 2 has an actuation mode for actuating engine 1.

CVT 3 includes an endless belt wound between a drive pulley and a driven pulley to enable a continuously variable gear ratio by changing the winding radius of the endless belt. The winding radius change is achieved by changing each pulley width. CVT 3 engages a starting clutch and an output shaft to transmit the output of engine 1 converted by the endless belt into drive axle 7 through gears at the output side of the starting clutch. The vehicle equipped with CVT 3 enables creep running while engine 1 is idling, and such a vehicle requires a driving force control unit DCU for decreasing driving force to be utilized for the creep running.

Driving Force Control Unit

The driving force control unit DCU is incorporated in CVT 3. The driving force control unit DCU variably controls the driving force transmission capacity of the starting clutch, thereby changing creep driving force. The driving force control unit DCU increases driving force when detecting displacement (or backward displacement) of the vehicle. The driving force control unit DCU comprises CVT ECU 6 which will be described later.

The driving force control unit DCU controls the driving force transmission capacity of the starting clutch and switches to the predetermined driving force in each creep condition when CVT ECU 6 determines conditions (hereinafter described) required for a weak creep condition, middle creep condition, strong creep condition or a strong creep condition for driving. Further, the driving force control unit DCU increases the driving force transmission capacity of the starting clutch and switches to the strong creep condition if displacement or backward displacement of the vehicle is detected when starting the vehicle on a slope. CVT ECU 6 determines conditions for switching the creep driving force, and it transmits a hydraulic pressure command value to a linear solenoid valve of CVT 3, where the engagement hydraulic pressure of the starting clutch is controlled. In the driving force control unit DCU, the engagement force of the starting clutch is adjusted at CVT 3 based on the hydraulic pressure command value. The driving force transmission capacity is therefore changed and the creep driving force is adjusted. Because the driving force control unit DCU decreases the driving force, the fuel consumption of the vehicle is improved. Fuel consumption of the vehicle is improved by reducing loads at engine 1, a hydraulic pump of the starting clutch and the like. The term "driving force transmission capacity" indicates the maximum driving force (driving torque) transmitted by the starting clutch. Therefore, if the driving force generated at engine 1 is greater than the driving force transmission capacity, the starting clutch does not transmit the remaining driving force, which is beyond the driving force transmission capacity, to driving wheels 8.

When a failure-detecting unit DU detects a malfunction of the brake fluid pressure retaining means RU (RU(A) or RU(B)) to be described later, the switching operation of the driving force control unit DCU to the weak creep condition is restricted.

The driving force control unit DCU transmits the driving force from the driving motor to the driving wheels 8, regardless of the release of the accelerator pedal at a certain or lower vehicle speed when the transmission is set to a running range. The driving force control unit DCU also switches driving force in accordance with depression of the brake pedal such that the driving force transmitted to the driving wheels 8 is made lower when the brake pedal BP is depressed and the driving force is made greater when the brake pedal BP is released.

The driving force is switched to a weak condition when the brake pedal BP is depressed in order to urge the driver to depress the brake pedal BP stronger so that the vehicle does not undesirably displace backwards due to its own weight while stopping on a slope, even if the driving force of engine 1 is lost. Meanwhile, the driving force is switched to a strong condition when the brake pedal BP is released for starting or accelerating of the vehicle, as well as for preventing backward displacement of the vehicle without requiring braking force.

According to this embodiment, the creep driving force of the vehicle includes three conditions: (1) a strong condition; (2) a weak condition; and (3) a middle condition between the strong and weak conditions. The driving force transmission capacity at each condition is predetermined to be greater in the strong condition, less in the weak condition, and intermediate in the middle condition.

In this embodiment, the strong condition (strong creep driving force) is referred to as a strong creep condition, the weak condition (weak creep driving force) is referred to as a weak creep condition, and the middle condition (intermediate creep driving force) is referred to as a middle creep condition. Further, the strong creep condition includes two driving force levels, i.e., a strong level and a weak level. The strong level is referred to as a strong creep condition, and the weak level is referred to as a strong creep condition for driving. In the strong creep condition, the driving force is adjusted in order to keep the vehicle stationary on a slope having an inclination angle of 5 degrees. In the strong creep condition for driving, the driving force is adjusted in to be less than that in the strong creep condition. The strong creep condition for driving is a preliminary condition before switching to the weak creep condition. In the weak creep condition, almost no driving force is obtained. In the middle creep condition, the driving force is controlled substantially at a mid point between the strong creep condition and the weak creep condition. The middle creep condition is an intermediate condition when the driving force is decreased stepwise in the process of switching from the strong creep condition to the weak creep condition. The strong creep condition is achieved when the accelerator pedal is released at a certain or lower vehicle speed (idling condition) and the positioning switch PSW selects a running range and when the brake pedal BP is released. In the strong creep condition, the vehicle moves slowly as if it creeps along the ground. If the driver depresses the brake pedal BP in this situation, the weak creep condition is achieved. The vehicle stops or moves at an extremely low speed in the weak creep condition.

The wording "the positioning switch PSW selects a running range" means that the transmission is set to a running range.

Positioning Switch

Range positions of the positioning switch PSW are selected by a shift lever. These range positions are selected from a P range for parking the vehicle, an N range as a neutral range, an R range for backward running, a D range for normal running, and an L range for obtaining a sudden acceleration or strong engine brake. The term "running range", indicates a range position, at which the vehicle can move. In this vehicle, the running range includes the D range, L range and R range. When the positioning switch PSW selects the D range, a D mode as a normal running mode and an S mode as a sports mode can be selected by a mode switch MSW. Information from the positioning switch PSW and the mode switch MSW is transmitted to CVT ECU 6 and a meter 10. Meter 10 indicates the range information and the mode information selected by the positioning switch PSW and the mode switch, respectively.

In this preferred embodiment, reduction of the creep driving force (switching operation to the middle creep condition and the weak creep condition) is carried out while the positioning switch PSW is set in the D or L range. The strong creep condition is retained while the positioning switch PSW is set in the R range. The driving force is not transmitted to the driving wheels 8 while the positioning switch PSW is set in the N or P range. However, the driving force transmission capacity is decreased and the driving force is substantially switched to the weak creep condition.

ECU and Others

The FI ECU contained in FI/MG ECU 4 controls the amount of fuel injection to achieve the optimum air fuel ratio, and it also generally controls engine 1. Various kinds of information such as a throttle angle and conditions of engine 1 are transmitted to the FI ECU such that engine 1 is controlled based on this information. The MG ECU contained in FI/MG ECU 4 mainly controls MOT ECU 5 as well as determining the automatic engine stop conditions and automatic engine actuation conditions. The MG ECU receives information regarding the conditions of motor 2 and other information such as the conditions of engine 1 from the FI ECU, and based on this information it sends instructions about the mode switching of motor 2 to MOT ECU 5. Further, the MG ECU receives information such as the conditions of CVT 3, conditions of engine 1, range information of the positioning switch PSW, conditions of motor 2 and the like, and based on this information it determines whether engine 1 should be automatically stopped or automatically actuated.

MOT ECU 5 controls motor 2 based on a control signal from FI/MG ECU 4. The control signal from FI/MG ECU 4 includes mode information instructing actuation of engine 1 by motor 2, assistance of the engine actuation or regeneration of electric energy, and an output required value to motor 2, and MOT ECU 5 sends an order to motor 2 based on this information. Further, MOT ECU 5 receives information from motor 2 and transmits information such as the amount of generated energy and the capacity of the battery to FI/MG ECU 4.

CVT ECU 6 controls the transmission gear ratio of CVT 3, the driving force transmission capacity of the starting clutch and the like. Various kinds of information such as the conditions of CVT 3, conditions of engine 1, range information of the positioning switch PSW and the like is transmitted to CVT ECU 6, and based on this information CVT ECU 6 transmits a signal to CVT 3. The signal includes control of the hydraulic pressure of each cylinder provided at the drive pulley and the driven pulley of CVT 3, and control of the hydraulic pressure of the starting clutch.

As shown in FIG. 2, CVT ECU 6 comprises a control unit CU for the ON/OFF control (shut-off/communicate) of the solenoid valves SV(A), SV(B) of the brake fluid pressure retaining means RU(A), RU(B). CVT ECU 6 transmits a signal for turning ON and OFF the solenoid valves SV(A), SV(B). CVT ECU 6 also determines the switching of the creep driving force as well as determining whether the driving force should be increased as a result of detecting displacement or backward displacement of the vehicle while the brake fluid pressure retaining means RU actuates. This information is transmitted to the driving force control unit DCU of CVT 3. CVT ECU 6 also comprises a failure-detecting unit DU for detecting a malfunction of the brake fluid pressure retaining means RU (RU(A) and RU(B)) to be described later.

CVT ECU 6 also determines the switching of the creep driving force as well as determining whether the driving force should be increased as a result of detecting displacement or backward displacement of the vehicle. And based on the determining result, CVT ECU 6 transmits a hydraulic pressure command value to a linear solenoid valve, which controls the hydraulic pressure of the starting clutch.

Driving Motor Stopping Unit

The driving motor stopping unit incorporated in the vehicle includes the FI/MG ECU 4 and other elements. The driving motor stopping unit enables an automatic engine stop operation while the vehicle stops. The automatic engine stop conditions are determined at the FI/MG ECU 4 and CVT ECU 6. The automatic engine stop conditions will be described later. When all of the automatic engine stop conditions are satisfied, FI/MG ECU 4 sends an engine stop order to engine 1 to automatically stop engine 1. Because the driving motor stopping unit automatically stops engine 1, the vehicle's fuel consumption improves.

FI/MG ECU 4 and CVT ECU 6 determines automatic engine actuation conditions while the driving motor stopping unit automatically stops engine 1. When all of the automatic engine actuation conditions are satisfied, FI/MG ECU 4 sends an engine actuation order to MOT ECU 5. MOT ECU 5 further transmits an engine actuation order to motor 2. Motor 2 then automatically actuates engine 1, and at the same time, the driving force is switched to the strong creep condition. The automatic engine actuation conditions will be described later.

Also, when the failure-detecting unit DU detects a malfunction of the brake fluid pressure retaining means RU (RU(A) or RU(B)), operation of the driving motor stopping unit is prohibited.

In a preferred embodiment, the various control units (e.g., the FI/MG ECU, CVT, ECU, MOT ECU, and others) comprise microprocessors for controlling the various operations.

Brakes (Braking Apparatus for Vehicles)

The braking apparatus BU for vehicles comprises a master cylinder MC, brake fluid pressure passages BC, wheel cylinders WC, brake fluid pressure retaining means RU (solenoid valves SV) and the like. The braking apparatus BU reduces the vehicle speed and stops the vehicle by the driver's operation by way of acting braking force on the vehicle. As mentioned above, the braking apparatus BU continuously retains brake fluid pressure within the wheel cylinders WC when starting the vehicle even after releasing the brake pedal BP, and it also releases the retained brake fluid pressure in a time differential manner at each brake fluid pressure passage BC. The braking apparatus BU further comprises the control unit CU in CVT ECU 6.

In the following descriptions, in the case that pluralities of elements or parts are provide with regard to the braking apparatus BU, such as brake fluid pressure passages BC and solenoid valves SV, a referential character such as (A) or (B) is put after each referential numeral when referring to a particular single element or part. Meanwhile, no such referential character is put after a referential numeral when referring to an overall construction.

A master cylinder piston MCP is inserted into a main body of the master cylinder MC. When the driver applies a load to the brake pedal BP, the piston MCP is pressed and pressure is applied to the brake fluid within the master cylinder MC so that mechanical force is converted into brake fluid pressure, i.e., the pressure applied to the brake fluid. When the driver releases the brake pedal BP by removing the applied load, the piston MCP is returned to the original position by the resilient action of a return spring MCS and brake fluid pressure is released. In order to have a fail-safe mechanism, two separate brake fluid pressure circuits BC are provided. For this reason, the master cylinder MC shown in FIG. 2 is a tandem master cylinder, where two pistons MCP are connected in series so that the main body of the master cylinder MC is divided into two portions.

A master power MP (brake booster) is provided between the brake pedal BP and the master cylinder MC to ease the braking effort of the driver. The master power MP shown in FIG. 2 is a vacuum servo type. The master power MP removes negative pressure from an intake manifold of engine 1 to facilitate the braking operation of the driver.

The brake fluid pressure passage BC connects the master cylinder MC and the wheel cylinders WC. The brake fluid pressure passage BC functions as a fluid channel for brake fluid. Brake fluid pressure generated at the master cylinder MC is transmitted to the wheel cylinders WC because the flow of the brake fluid travels through the brake fluid pressure passage BC. When the brake fluid pressure within the wheel cylinders WC is greater, the brake fluid is transmitted from the wheel cylinders WC to the master cylinder MC through the brake fluid pressure passage BC.

As shown in FIG. 2, the braking apparatus BU has two separate systems (viz. system A and system B) of the brake fluid pressure passage BC. That is, the brake fluid pressure passage BC is divided into two brake fluid pressure passages BC(A), BC(B). As described later, release of the brake fluid pressure can be carried out at each brake fluid pressure passage system in a time differential manner. The brake fluid pressure circuit, such as constructed by the brake fluid pressure passages BC(A), BC(B) shown in FIG. 2, is an X-piping type, where one brake fluid pressure passage BC(A) is for braking a front right wheel and a rear left wheel, and the other brake fluid pressure passage BC(B) is for braking a front left wheel and a rear right wheel. At point J, the brake fluid pressure passage BC is divided into two passages BC(A), BC(B), and each passage BC(A), BC(B) is connected to two wheel cylinders WC. The brake fluid pressure passage BC may be a front and rear dividing type, where one brake fluid pressure passage is for braking the front wheels, and the other brake fluid pressure passage is for braking the rear wheels.

The wheel cylinder WC is provided for each wheel 8, viz. four wheel cylinders WC in total, so that brake fluid pressure generated at the master cylinder MC and transmitted to the wheel cylinders WC through the brake fluid pressure passage BP is converted into a mechanical force (braking force) for braking wheels 8. A piston is inserted into the wheel cylinder WC so that when the piston is pressed by the brake fluid pressure, it generates a braking force for actuating brake pads in disc brakes or brake shoes in drum brakes.

With reference to FIG. 2, the brake fluid pressure retaining means RU is incorporated within the brake fluid pressure passage BC connecting the master cylinder MC and the wheel cylinders WC and includes a solenoid valve SV, restriction D, check valve CV and a relief valve RV. The restriction D, check valve CV and the relief valve RV are provided as necessary.

The solenoid valve SV is incorporated within the brake fluid pressure passage BC connecting the master cylinder MC and the wheel cylinder WC of the braking apparatus BU as a hydraulic braking apparatus. In this embodiment, the solenoid valve SV is provided in the brake fluid pressure passage BC at a mid point between the master cylinder MC and the branch point J. The solenoid valve SV is actuated by a flag signal F_SOLA OR F_SOLB, and switches between a communicating position, where the master cylinder MC and the wheel cylinders WC are connected, and a shut-off position, where the communication between the master cylinder MC and the wheel cylinders WC are shut off. The solenoid valve SV(A) in one system switches to the shut-off position when the flag signal F_SOLA is 1 (ON), and switches to the communicating position when the flag signal F_SOLA is 0 (OFF). Also, the solenoid valve SV(B) in the other system switches to the shut-off position when the flag signal F_SOLB is 1 (ON), and switches to the communicating position when the flag signal F_SOLB is 0 (OFF). The solenoid valve SV shuts off a flow of brake fluid within the brake fluid pressure passage BC in its shut-off position to retain the brake fluid pressure applied to the wheel cylinder WC, and allows a flow of brake fluid in the brake fluid pressure passage BC in its communicating position.

The solenoid valve SV may be provided in the brake fluid pressure passage BC at a mid point between the branch point J and the wheel cylinder WC. In the above arrangement where the solenoid valve SV is provided between the master cylinder MC and the branch point J, switching of the solenoid valve SV to the shut-off position enables to retain the brake fluid pressure within two wheel cylinders WC. However, in this arrangement, switching of the solenoid valve SV to the shut-off position enables to retain the brake fluid pressure within one wheel cylinder WC only.

In both arrangements, even if the driver releases a depression of the brake pedal BP upon starting the vehicle on a slope, the solenoid valve SV retains the brake fluid pressure within the wheel cylinder WC, thereby preventing the vehicle from undesirably rolling down the slope. The term "rolling down" or "backward displacement" means that the vehicle moves in an opposite direction to the driver's intention, due to its own weight.

The solenoid valve SV may be one of normally open and normally closed types. However, in order to have a fail-safe mechanism, a normally open type is preferable. This is because when electricity is cut off due to a malfunction, the brake does not work or the brake always works in a normally closed type solenoid valve SV. In the normal operation, the solenoid valve SV is shut off when the vehicle stops, and is kept in the shut-off position until the vehicle starts to move. Conditions for switching the solenoid valve SV to the shut-off position (ON) or to the communicating position (OFF) will be described later.

A restriction D is provided as necessary to be parallel to the solenoid valve SV. The restriction D always connects the master cylinder MC and the wheel cylinders WC regardless of the conditions of the solenoid valve SV such as in the communicating position or the shut-off position. When the solenoid valve SV is in the shut-off position and the driver gradually or instantly releases the brake pedal BP, the restriction D reduces brake fluid pressure within the wheel cylinder WC at a certain speed by gradually transferring brake fluid from the wheel cylinder WC to the master cylinder MC. A restriction D may be formed, for example at a part of the brake fluid passage that is parallel to the solenoid valve SV, by way of flow resistance (reduced area portion of the passage, at which a part of the section becomes narrow).

When the restriction D is provided, if the driver gradually or instantly releases the brake pedal BP, the braking force is gradually lowered so that even if the solenoid valve SV is in the shut-off position, the brake does not work permanently. In other words, the reduction speed of the brake fluid pressure within the wheel cylinder is less than that of brake pedal load applied by the driver. Therefore, even if the solenoid valve SV is in the shut-off position, the braking force is reduced after a certain period of time so that the vehicle can start to move on an up slope by the driving force of the driving motor. Meanwhile, the vehicle can start off on a down slope due to its own weight by merely releasing the brake pedal BP gradually or instantly without requiring the accelerator pedal operation of the driver.

The restriction D does not affect the braking force as long as the brake fluid pressure within the master cylinder MC due to the driver's brake pedal operation is greater than that within the wheel cylinder WC. This is because brake fluid flows based on a pressure difference between the wheel cylinder WC and the master cylinder MC, i.e. from one at a higher brake fluid pressure to the other at a lower brake fluid pressure. Unless the driver releases the brake pedal BP, the brake fluid pressure within the wheel cylinder WC does not decrease although it may increase. The restriction D may function as a check valve to prevent a counter flow from the master cylinder MC to the wheel cylinder WC.

Reduction speed of the brake fluid pressure within the wheel cylinder WC is determined to prevent the vehicle from undesirable backward displacement during the time the driver releases the brake pedal BP and the driving force is switched from the weak creep condition to the strong creep condition.

When the reduction speed of the brake fluid pressure within the wheel cylinder WC is faster, the vehicle will displace backwards on the slope before sufficient driving force will be obtained because braking force after releasing the brake pedal BP will be lost immediately even if the solenoid valve SV is closed. On the contrary, when the reduction speed of brake fluid pressure within the wheel cylinder WC is slower, the vehicle will not displace backwards on the slope after releasing the brake pedal BP because the brake is working at all times. However, extra time and driving force is required for obtaining sufficient driving force against the braking force. As described later, according to this embodiment, the solenoid valve SV is returned to the communicating position when a driving force is exerted on the vehicle and depression of the brake pedal BP is released. Therefore, when the vehicle starts by driving force, reduction speed of the brake fluid pressure within the wheel cylinder WC by way of the restriction D may be slower.

Reduction speed for reducing brake fluid pressure within the wheel cylinder WC is determined by properties of the brake fluid or the shape of the restriction D (cross section or length of the flow passage). The restriction D may be employed as an integral member with a solenoid valve SV and a check valve CV. In this case, the number of parts and installation space may be reduced.

A check valve CV is provided as necessary to be parallel to the solenoid valve SV. The check valve CV transfers the brake fluid pressure generated within the master cylinder MC into the wheel cylinders WC when the solenoid valve SV is closed and the driver increases the brake pedal load. The check valve CV works effectively when the brake fluid pressure generated within the master cylinder MC is greater than that within the wheel cylinder WC. The check valve CV quickly increases brake fluid pressure within the wheel cylinder WC in accordance with the increased brake pedal load.

If an arrangement is employed such that the solenoid valve SV is switched from the shut-off position to the communicating position when the brake fluid pressure within the master cylinder MC becomes greater than that within the wheel cylinders WC, there is no need to provide a check valve CV because the solenoid valve SV itself responds to the increased brake pedal load.

A relief valve RV is also provided as necessary to be parallel to the solenoid valve SV. The relief valve RV transfers brake fluid within the wheel cylinder WC into the master cylinder MC until the brake fluid pressure within the wheel cylinder becomes a certain pressure level (relief pressure) when the solenoid valve SV is in the shut-off position and the driver gradually or instantly releases the brake pedal BP. The relief valve RV works when the brake fluid pressure within the wheel cylinder WC is greater than the predetermined brake fluid pressure and the brake fluid pressure within the master cylinder MC. Therefore, even if the solenoid valve SV is in the shut-off position, extra brake fluid pressure within the wheel cylinder WC, beyond the necessary brake fluid pressure, is quickly reduced to the relief pressure. This will ensure a smooth starting operation of the vehicle even if the driver forcefully depresses the brake pedal BP more than required. Providing the relief valve RV is advantageous when the vehicle starts on a down slope without assistance of driving force, for example a starting operation of the vehicle due to its own weight by releasing the brake pedal BP.

A brake switch BSW detects whether or not the brake pedal BP has been depressed, and transmits the detection result to CVT ECU 6 (control unit CU) as a signal F_BKSW.

Control unit CU included in CVT ECU 6 comprises CPU (not shown), memory, input/output interface, bus, and the like, and controls the braking apparatus BU for vehicles. Various signals, such as F_BKSW from the brake switch BSW, a hydraulic pressure command value V_SCHP to a linear solenoid valve of CVT 3, where the engagement hydraulic pressure of the starting clutch is controlled, and a vehicle speed pulse V_VSP1 are inputted into the control unit CU in order to control ON/OFF of the solenoid valves SV(A), SV(B). For this reason, the control unit CU generates flag signals F_SOLA, F_SOLB to turn on and off the solenoid valves SV(A), SV(B), and transmits them to the solenoid valves SV(A), SV(B). As mentioned above, the solenoid valve SV(A) is ON when the flag signal F_SOLA is "1", and is OFF when the flag signal F_SOLA is "0". Likewise, the solenoid valve SV(B) is ON when the flag signal F_SOLB is "1", and is OFF when the flag signal F_SOLB is "0". Conditions for turning on and off the solenoid valve SV, viz. the conditions that the brake fluid pressure retaining means RU retains brake fluid pressure and the conditions that the retained brake fluid pressure is released, will be described later.

The control unit CU has a time difference setting function such as a timer, and carries out a release of the brake fluid pressures retained within the brake fluid pressure retaining means RU(A) and RU(B) in a time differential manner. In other words, switching time from ON to OFF can be differentiated between the solenoid valves SV(A) and SV(B). In view of various experimental results, 20 ms (milliseconds) is set as a time difference setting function. That is, when the flag signal F_SOLA turns from "1" to "0", 20 ms later, the flag signal F_SOLB turns from "1" to "0". When setting the time difference greater, the release of the brake fluid pressure is carried out smoothly. However, if the time difference is set too great, the brake dragging will arise. Meanwhile, if the time difference is set too small, the retained brake fluid pressure is released instantly, leading to a sudden start of the vehicle.

As a brake fluid pressure retaining means RU, a servo valve (linear solenoid valve) may be employed in place of the arrangement comprising a restriction D, a relief valve RV and a check valve CV in addition to a solenoid valve SV. The servo valve can adjust a flow rate of the brake fluid, which flows through the valve, by the control signal to be inputted.

In the case of an arrangement where a servo valve is employed as a brake fluid pressure retaining means RU, as long as a release speed of the retained brake fluid pressure differs, release of the brake fluid pressures may start simultaneously between servo valves in one system and the other. Since the release of the brake fluid pressures can be carried out in a time differential manner, viz. the finishing points of the release can be differentiated, a smooth start of the vehicle without any sudden feels can be achieved. It is also possible to employ a brake fluid pressure retaining means RU including a solenoid valve SV in one system and another brake fluid pressure retaining means RU including a servo valve in the other system, and the release of the brake fluid pressures can be carried out in a time differential manner (, viz. the finishing points of the release can be differentiated).

Signals

Signals to be transmitted and received in this vehicle will be described. With reference to FIG. 1, the letter "F_" in front of each signal indicates that the signal is flag information, which is either a 0 or 1. The letter "V_" indicates that the signal is numerical information (unit is optional), and the letter "I_" indicates that the signal includes different kinds of information.

Signals transmitted from FI/MG ECU 4 to CVT ECU 6 will be described. V_MOTTRQ represents an output torque value of motor 2. F_MGSTB is a flag showing whether all of the engine stop conditions determined at FI/MG ECU 4 are satisfied. If all the conditions are satisfied, a 1 is provided, and if not, 0 is provided. The automatic engine stop conditions regarding F_MGSTB will be described later. When F_MGSTB and F_CVTOK (hereinafter described) are both set to 1, engine 1 is automatically stopped. When one of these flags is set to 0, engine 1 is automatically actuated.

A signal transmitted from FI/MG ECU 4 to CVT ECU 6 and MOT ECU 5 will be described. V_NEP represents engine speed.

Signals transmitted from CVT ECU 6 to FI/MG ECU 4 will be described. F_MCRPON is a flag indicating whether or not the driving force is in the middle creep condition. A 1 is provided in the middle creep condition, and if not, a 0 is provided. When F_MCRPON is 1, engine 1 is required to blow middle air in the middle creep condition (weaker air than that in the strong creep condition). F_AIRSCRP is a strong air demand flag in the strong creep condition. If strong air is required in the strong creep condition, a 1 is provided, and if not, a 0 is given. When both F_MCRPON and F_AIRSCRP are 0, FI/MG ECU 4 blows weak air in the weak creep condition. In order to keep the engine idle speed at a certain level regardless of the driving force in the strong creep condition, middle creep condition or the weak creep condition, the engine output should be adjusted by blowing air corresponding to the strong creep condition, middle creep condition or the weak creep condition. When the driving force is in the strong creep condition and the load of engine 1 is higher, a strong air blow (strong air in the strong creep condition) is required. The term "air blow" means the supply of air from an air passage by-passing a throttle valve in engine 1 to an intake pipe positioned downstream from the throttle valve. Air flow is adjusted by controlling the degree of the opening of the air passage. F_CVTOK is a flag indicating whether all of the engine stop conditions determined at CVT ECU 6 are satisfied. If all the conditions are satisfied, a 1 is provided, and if not, a 0 is provided. The automatic engine stop conditions regarding F_CVTOK will be described later. F_CVTTO is a flag indicating whether the oil temperature of CVT 3 is greater than a certain value. If the oil temperature is equal to or greater than the certain value, a 1 is provided, and if the oil temperature is less than the value, a 0 is provided. The oil temperature of CVT 3 is obtained from an electrical resistance value of the linear solenoid valve controlling the hydraulic pressure of the starting clutch at CVT 3. F_POSR is a flag indicating whether the positioning switch PSW is set in the R range. If the positioning switch PSW is set in the R range, a 1 is provided, and if not, a 0 is provided. F_POSDD is a flag indicating whether the positioning switch PSW is set in the D range and the mode switch MSW is set in the D mode. If the D range and D mode (D range/D mode) are selected, a 1 is provided, and if not, a 0 is provided. When FI/MG ECU 4 does not receive any information indicating the D range/D mode, R range, P range or N range, FI/MG ECU 4 determines that either the D range/S mode or L range is selected.

Signals transmitted from engine 1 to FI/MG ECU 4 and CVT ECU 6 will be described. V_ANP represents a negative pressure value at the intake pipe of engine 1. V_TH represents a throttle angle. V_TW represents a temperature of the cooling water at engine 1. V_TA represents the intake temperature of engine 1. The brake fluid temperature in the brake fluid pressure retaining means RU disposed within the engine compartment is obtained from the intake temperature. This is because both temperatures change with respect to the temperature at the engine compartment.

A signal transmitted from CVT 3 to FI/MG ECU 4 and CVT ECU 6 will be described. V_VSP1 represents a vehicle speed pulse from one of two vehicle speed pickups provided in CVT 3. Vehicle speed is calculated based on this vehicle speed pulse.

Signals transmitted from CVT 3 to CVT ECU 6 will be described. V_NDRP represents a pulse showing the number of revolutions of the drive pulley provided at CVT 3. V_NDNP represents a pulse showing the number of revolutions of the driven pulley provided at CVT 3. V_VSP2 represents a vehicle speed pulse from the other vehicle speed pickup at CVT 3. V_VSP2 is more accurate than V_VSP1, and V_VSP2 is used for calculating the amount of clutch slipping at CVT 3.

Signals transmitted from MOT ECU 5 to FI/MG ECU 4 will be described. V_QBAT represents the remaining capacity of the battery. V_ACTTRQ represents an output torque value of motor 2, which is the same as V_MOTTRQ. I_MOT represents information such as the amount of generated energy of motor 2 showing electric loading. Motor 2 generates all the electric power consumed for the vehicle, including the electric power for driving the motor.

Signals transmitted from FI/MG ECU 4 to MOT ECU 5 will be described. V_CMDPWR represents an output required value to motor 2. V_ENGTRQ represents an output torque value of engine 1. I_MG represents information such as an actuation mode, assist mode and a regeneration mode with respect to motor 2.

A signal transmitted from the master power MP to FI/MG ECU 4 will be described. V_M/PNP represents a negative pressure detected value at a constant pressure chamber of the master power MP.

A signal transmitted from the positioning switch PSW to FI/MG ECU 4 will be described. An N or P is transmitted as positioning information when the positioning switch PSW selects either the N or P range.

Signals transmitted from CVT ECU 6 to CVT 3 will be described. V_DRHP represents a hydraulic pressure command value transmitted to the linear solenoid valve, which controls hydraulic pressure within the cylinder of the drive pulley at CVT 3. V_DNHP represents a hydraulic pressure command value transmitted to the linear solenoid valve, which controls hydraulic pressure within the cylinder of the driven pulley at CVT 3. The transmission gear ratio of CVT 3 is changed by V_DRHP and V_DNHP. V_SCHP represents a hydraulic pressure command value transmitted to the linear solenoid valve, which controls the hydraulic pressure of the starting clutch at CVT 3. The engaging force of the starting clutch (driving force transmission capacity) is changed by V_SCHP.

Signals transmitted from CVT ECU 6 (control unit CU) to the brake fluid pressure retaining means RU will be described. F_SOLA is a flag for the ON/OFF (close/open) of the solenoid valve SV(A) of the brake fluid pressure retaining means RU(A) (shown in FIG. 2). A 1 is provided for closing (ON) the solenoid valve SV(A), and a 0 is provided for opening (OFF) the solenoid valve SV(A). Likewise, F_SOLB is a flag for the ON/OFF (close/open) of the solenoid valve SV(B) of the brake fluid pressure retaining means RU(B) (shown in FIG. 2). A 1 is provided for closing (ON) the solenoid valve SV(B), and a 0 is provided for opening (OFF) the solenoid valve SV(B).

A signal transmitted from the positioning switch PSW to CVT ECU 6 will be described. The positioning switch PSW selects the N, P, R, D or L range, and the selected range is transmitted as positioning information.

A signal transmitted from the mode switch MSW to CVT ECU 6 will be described. The mode switch MSW selects either the D (normal running mode) or S mode (sports running mode), and the selected mode is transmitted as mode information. The mode switch MSW is a mode selection switch, which works when the positioning switch PSW is set in the D range.

A signal transmitted from the brake switch BSW to FI/MG ECU 4 and CVT ECU 6 will be described. F_BKSW is a flag showing whether the brake pedal BP is depressed (ON) or released (OFF). If the brake pedal BP is depressed, a 1 is provided, and if the brake pedal is released, a 0 is provided.

Signals transmitted from CVT ECU 6 to meter 10 will be described. The positioning switch PSW selects the N, P, R, D or L range, and the selected range is transmitted as positioning information. Further, the mode switch MSW selects either the D (normal running mode) or S mode (sports running mode), and the selected mode is transmitted as mode information.

Basic Control of Braking Apparatus for Vehicles and Others

With reference to FIGS. 1 to 3, basic control of the aforementioned braking apparatus BU for vehicles and release patterns of brake fluid pressure based on this basic control will be described.

Basic Control of Braking Apparatus for Vehicles

1) Braking apparatus BU (control unit CU) switches the solenoid valve SV(A), SV(B) to the shut-off position when the brake pedal BP is depressed while the vehicle stops.

(a) Vehicle has to be stopped. This is a condition because the driver can not park the vehicle at desired positions if the solenoid valves SV are switched to the shut-off position while the vehicle is moving at high speeds. However, switching the solenoid valves SV to the shut-off position does not affect the driver's operation if the vehicle stops. The condition "while the vehicle stops" includes the time just before the vehicle stops.

(b) Brake pedal BP is depressed. This is a condition because no brake fluid pressure is retained if the brake pedal BP is not depressed. There is no significance to switching the solenoid valve SV to the shut-off position while the brake pedal is released.

The driver can stop the vehicle securely on a slope with the brake pedal BP forcefully depressed if a condition other than the above conditions (a) and (b) is added. This condition requires that the driving force transmission capacity is in the smaller condition when the solenoid valve SV is switched to the shut-off position for retaining brake fluid pressure. This leads to improved fuel consumption by the vehicle. The smaller condition of the driving force also includes a case when the driving force is zero and a case when the engine 1 is stopped.

2) Braking apparatus BU (control unit CU) releases the brake fluid pressure (i.e. the solenoid valve SV is returned to the communicating position) after the brake pedal BP is released and in accordance with an increase of the starting driving force of the vehicle.

(a) Brake pedal BP is released. This is a condition because the driver intends to start the vehicle when depression of the brake pedal BP is released.

(b) Brake fluid pressure is released in accordance with an increase of the starting driving force of the vehicle. This is a condition because the vehicle may undesirably displace backwards if the retained brake fluid pressure is released before the driving force sufficiently rises. The increase of the starting driving force is achieved in a point after a depression of the brake pedal BP is released and before the driving force increases to the strong creep condition (strong condition).

On a down slope where the vehicle's own weight affects, for example, if the starting driving force increases to the strong creep condition and the retained brake fluid pressure is released at one time, the vehicle likely to start with a sudden impact. According to the present invention, the braking apparatus releases the brake fluid pressure stepwise, instead of releasing the brake fluid pressure at one time. As a result, the braking force is released smoothly, and a smooth starting operation of the vehicle can be carried out even in a down slope where the driver often feels a sudden impact. Further, even on a slippery road surface with a small coefficient of frictional resistance ($\mu$), such as a snowy road or icy road, where slippage or idle spin of the driving wheels occurs, the driving force is restricted due to stepwise release of the brake fluid pressure (i.e. stepwise loss of the braking force), thereby allowing a smooth start of the vehicle.

On an up slope where an undesirable backward displacement of the vehicle would occur, the inertial force and the rolling resistance of the vehicle affects as a backward displacement prevention force. Therefore, even if the retained brake fluid pressure is released at a point when the starting driving force has not risen to resist against the slope, the vehicle does not immediately displace backwards due to the inertial force and the rolling resistance of the vehicle as well as the increasing starting driving force of the vehicle. Further, the braking apparatus BU does not release the brake fluid pressure at one time. Accordingly, undesirable backward displacement of the vehicle can be restricted, and a smooth start of the vehicle can be achieved.

The timing at which the release of the retained brake fluid pressure is carried out should be determined with consideration of the inertial force and the rolling resistance of the vehicle, as well as in comparing the advantages and disadvantages of the slope. In the braking apparatus BU which releases the retained brake fluid pressure in a time differential manner, the starting driving force for releasing the brake fluid pressure may be set in a wide range. This means that products with a stable quality can be provided.

Release Patterns of Brake Fluid Pressure (a) Release patterns of brake fluid pressure, in which a starting point of the release of the brake fluid pressure is different at each system, will be described.

Figure 3A:
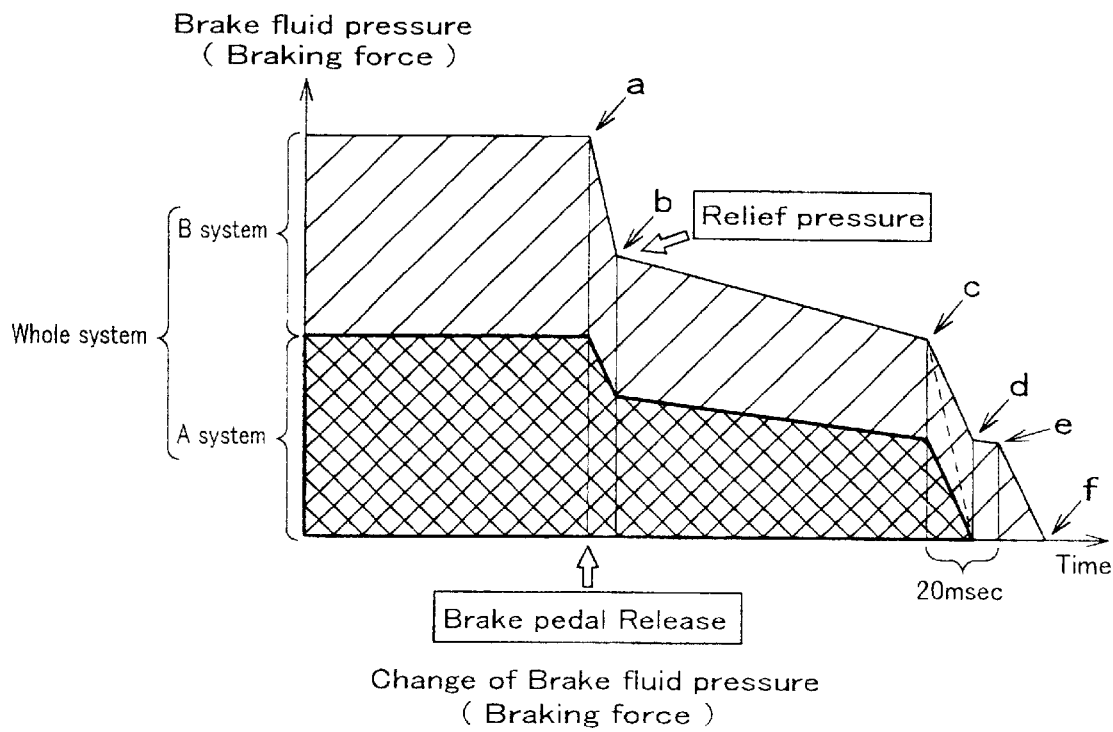

As shown in FIG. 3A, with the brake fluid pressure retaining means RU(A), RU(B), viz. the solenoid valves SV(A), SV(B), the same brake fluid pressure is retained in A system and B system.

The braking force generated on the vehicle is expressed as a resultant force of a braking force generated by the brake fluid pressure within A system and a braking force generated by the brake fluid pressure within B system, viz. the total of the brake fluid pressures within A and B systems.

In order to start the vehicle, the driver releases a depression of the brake pedal BP at Point a. The relief valve RV in both systems actuates and the brake fluid pressure (braking force) decreases to the relief pressure (Point b). Because the solenoid valve SV is in the shut-off position, the brake fluid pressure gradually decreases through the restriction D from Point b, in which the retained brake fluid pressure is the relief pressure of the relief valve RV or lower. Meanwhile, although not shown, the starting driving force of the vehicle increases to the strong creep condition at the release of the brake pedal BP. It is determined that the starting driving force of the vehicle has risen at Point c. At first, the solenoid valve SV(A) in A system releases the retained brake fluid pressure. As a result, the whole braking force decreases from Point c to Point d.

The brake fluid pressure retained within A system decreases to zero at Point d. However, at this point, the solenoid valve SV(B) in B system still retains the brake fluid pressure. Therefore, the brake fluid pressure retained in B system is the whole braking force. And at Point e, because 20 ms has passed from Point c, the solenoid valve SV(B) in B system releases the retained brake fluid pressure. At Point f the brake fluid pressure is lost. A phantom line is extending downwardly from Point c. The phantom line indicates a case when the brake fluid pressure (braking force) is released immediately at both systems, like a conventional braking apparatus.

Accordingly, because the starting point of the release of the brake fluid pressure is different at each system, the braking force is released smoothly in the end. Therefore, when the vehicle stops on an up slope, a smooth start of the vehicle without an undesirable backward displacement can be achieved. Meanwhile, when the vehicle stops on a down slope, a smooth start of the vehicle without a sudden feel can be achieved. Further, when the vehicle stops on a slippery road surface, such as an icy road or snowy road, a smooth start without slippage or idle spin of the driving wheels can be achieved.

It is also possible to determine that the starting driving force has risen at a point (for example, the midpoint) between Point c and Point e of FIG. 3A. In other words, the reference point for starting the release of the brake fluid pressure at A and B systems may be set optionally at a point (for example, the midpoint) between Point c and Point e.

(b) Release patterns of brake fluid pressure, in which a release speed of the brake fluid pressure differs at each system, will be described.

In this braking apparatus BU, a solenoid valve SV is used as a brake fluid pressure retaining means RU(A) in A system, and a servo valve is used as a brake fluid pressure retaining means RU(B) in B system. The release of the brake fluid pressure is carried out simultaneously at both systems. However, the release speed of the brake fluid pressure at B system is slower than that of the brake fluid pressure at A system.

Figure 3B:
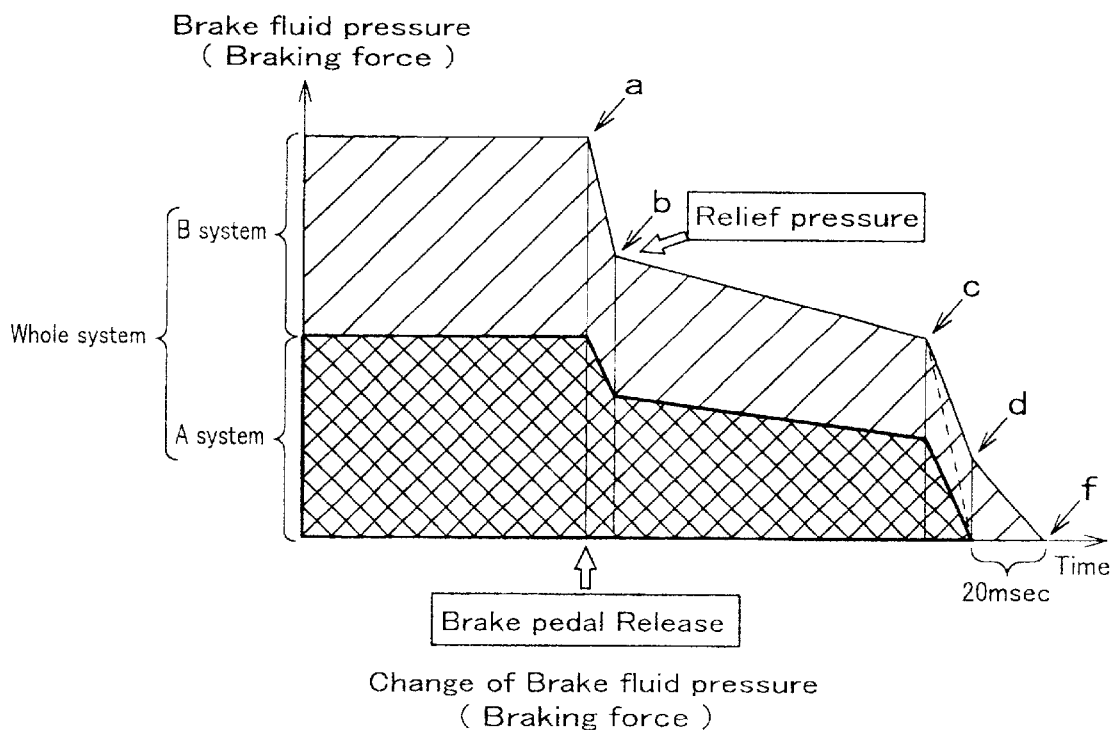

With reference to FIG. 3B, operations from Point a through Point c are the same as those described with reference to FIG. 3A, and the explanations thereof will be omitted.

Not like the operations (a) above, when it is determined that the starting driving force of the vehicle has risen at Point c, the brake fluid pressure retaining means RU(A), RU(B) at both systems start to release the brake fluid pressure simultaneously. As a result, the whole braking force decreases from Point c to Point d.

However, because the release speed of the brake fluid pressure at A system is faster, the brake fluid pressure retained in A system first decreases to zero at Point d. However, at this point, the brake fluid pressure retaining means RU(B) at B system still retains some brake fluid pressure. Therefore, the braking force still acts on the vehicle. And the brake fluid pressure at B system decreases to zero at Point f with a delay from A system. In this figure, 20 ms later the brake fluid pressure at A system decreases to zero, the brake fluid pressure at B system decreases to zero. A phantom line is extending downwardly from Point c. The phantom line indicates a case when the brake fluid pressure (braking force) is released immediately at both systems, like a conventional braking apparatus.

Accordingly, the braking force can be released smoothly by providing different release speeds of the brake fluid pressure. Therefore, when the vehicle stops on an up slope, a smooth start of the vehicle without an undesirable backward displacement can be achieved. Meanwhile, when the vehicle stops on a down slope, a smooth start of the vehicle without a sudden feel can be achieved. Further, when the vehicle stops on a slippery road surface, such as an icy road or snowy road, a smooth start of the vehicle without slippage or idle spin of the driving wheels can be achieved.

Control of Braking Apparatus and Vehicle

With reference to FIGS. 1 to 10, control of the braking apparatus BU and the vehicle furnished with the braking apparatus BU will be described in great detail.

Conditions for Retaining Brake Fluid Pressure

Figure 4A:
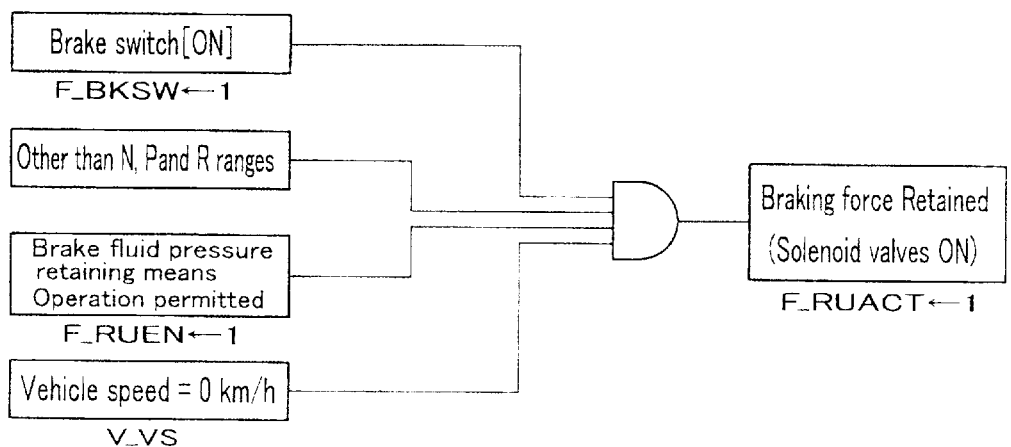
FIG. 4A shows the logic for retaining brake fluid pressure.

Conditions for retaining the brake fluid pressure by the braking apparatus BU, i.e. the brake fluid pressure retaining means RU, will be described below. As shown in FIG. 4A, the brake fluid pressure is retained when all of the following four conditions are satisfied.

I) Brake switch BSW is ON.

II) Driving range is other than Neutral (N range), Parking (P range) and Reverse (R range).

III) Operation of the brake fluid pressure retaining means RU is permitted.

IV) Vehicle speed is 0 km/h.

When all the above conditions are satisfied, both solenoid valves SV(A), SV(B) are switched to the shut-off position, thereby retaining the brake fluid pressure.

The above four conditions will be described below.

I) Brake switch BSW is ON. This is a condition because no brake fluid pressure or few brake fluid pressure will be retained within the wheel cylinders WC.

II) Driving range is other than Neutral (N range), Parking (P range) and Reverse (R range). This is a condition for canceling unnecessary operation of the brake fluid pressure retaining means RU in the N or R range, and in the R range, for preventing the vehicle from undesirably rolling down a slope with the aid of the driving force in the strong creep condition because the strong creep condition is kept in the R range.

Therefore, the brake fluid pressure is retained while the D (driving range) or L range (low range) is selected.

III) Operation of the brake fluid pressure retaining means RU is permitted. This condition is for reminding the driver to sufficiently depress the brake pedal BP before retaining the brake fluid pressure, thereby preventing the vehicle from undesirably rolling down a slope. Because sufficient brake fluid pressure (driving force) is obtained in the strong creep condition so that the vehicle can stand still on a slope at an inclination angle of 5 degrees, the driver often depresses the brake pedal BP insufficiently. In this situation, if the solenoid valve SV is closed and engine 1 is stopped, the vehicle will undesirably displace backwards. Meanwhile, in the weak creep condition and the middle creep condition, the driving force is not sufficient for keeping the vehicle stationary on a slope having an inclination angle of 5 degrees. For this reason, the driving force is weakened in order to urge the driver to forcefully depress the brake pedal BP and in order to obtain sufficient brake fluid pressure to prevent the backward displacement of the vehicle even if the driving force is decreased or lost. The control logic for permitting an operation of the brake fluid pressure retaining means RU will be described later.

IV) Vehicle speed is 0 km/h. This is a condition because the driver cannot select a position for parking the vehicle if the solenoid valve SV is switched to the shut-off position while the vehicle is running.

Meanwhile, because the vehicle stops when the vehicle speed is 0 km/h, the brake fluid pressure can be retained without causing any trouble in the driving operation. "Vehicle speed of 0 km/h" also includes a condition just before the vehicle stops.

Figure 4B:
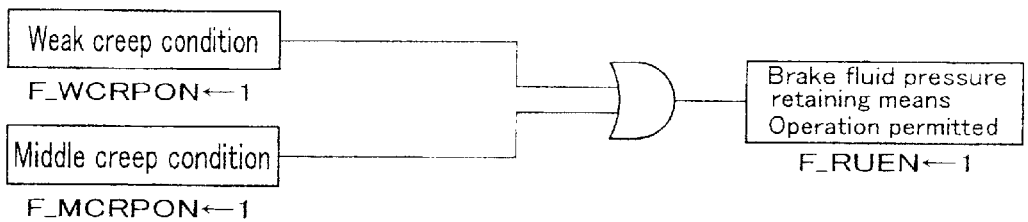
FIG. 4B shows the logic for permitting an operation of the brake fluid pressure retaining means.

Conditions Required for Permitting Operation of the Brake Fluid Pressure Retaining Means With reference to FIG. 4B, conditions required for permitting an operation of the brake fluid pressure retaining means RU will be described. An operation of the brake fluid pressure retaining means RU is permitted while the driving force is either in the weak creep condition or in the middle creep condition. In the weak creep condition and the middle creep condition, the driving force is not sufficient for keeping the vehicle stationary on a slope having an inclination angle of 5 degrees. Therefore, the driver is forced to depress the brake pedal BP sufficiently before retaining the brake fluid pressure to obtain sufficient braking force for preventing backward displacement of the vehicle. The driving force in the weak creep condition or in the middle creep condition is determined based on a hydraulic pressure command value to a linear solenoid valve of CVT 3, where the engagement the hydraulic pressure of the starting clutch is controlled.

Conditions Required for Weak Creep Order

Figure 5A:
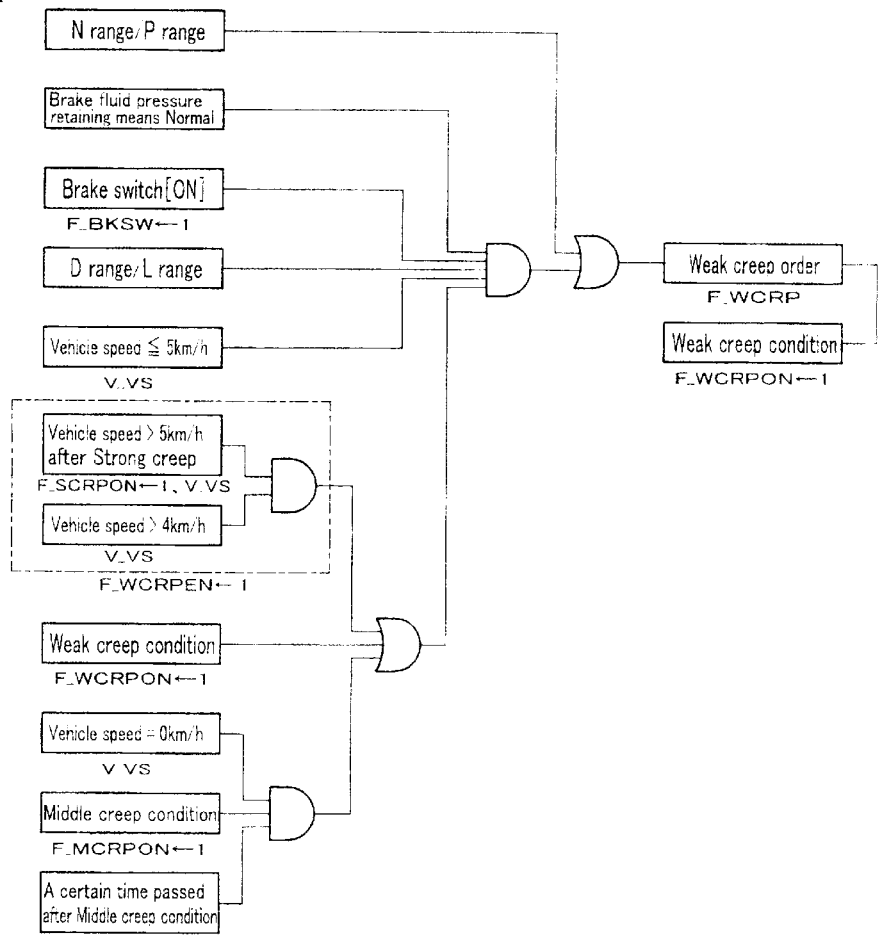
FIG. 5A shows the control logic for switching to a weak creep condition.

Conditions for transmitting a weak creep order will be described. As shown in FIG. 5A, the weak creep order (F_WCRP) is transmitted when any of the following conditions I) and II) is satisfied. The conditions are:

I) Transmission is set in the N or P range

II) The following two conditions are both satisfied:
  a. (1) Brake fluid pressure retaining means RU is normal;
  (2) Brake switch BSW is ON;
  (3) Positioning switch PSW selects an advance range (D range/L range); and
  (4) Vehicle speed is at 5 km/h or lower; and
  B. (5) Vehicle speed after switching to the strong creep condition >5 km/h and vehicle speed >4 km/h; or
  (6) Driving force is in the weak creep condition; or (7) Vehicle speed is 0 km/h, Driving force is in the middle creep condition, and a certain time has passed after switching to the middle creep condition.

When one of the above conditions I) and II) is satisfied, the weak creep order is transmitted and the driving force is switched to the weak creep condition. The above conditions are determined at the driving force control unit DCU. The reason for switching the driving force to the weak creep condition is to improve the vehicle's fuel consumption. When on a slope, it is for reminding the driver to forcefully depress the brake pedal BP to prevent backward displacement of the vehicle while the vehicle stops on the slope.

The conditions for transmitting the weak creep order will be described.

I) Transmission is set in the N or P range. This is a condition because if the transmission is selected from a non-driving range (N/P range) to a driving range (D/L/R range) and at the same time the accelerator pedal is quickly depressed, the driving force transmission capacity of the starting clutch can be instantly increased, allowing a smooth starting operation of the vehicle. In the weak creep condition, because pressure oil has been filled in an oil pressure chamber of the starting clutch, there is no clearance or play for the advance stroke of the piston enforcing the clutch. Therefore, the driving force transmission capacity is instantly increased by increasing the pressure value of the pressure oil.

Driving force is switched to the weak creep condition when the transmission is switched to the N or P range. This is for previously changing the driving force transmission capacity of the starting clutch to the capacity at the weak creep condition. However, the driving force from engine 1 is not transmitted to driving wheels 8. This is distinguished from the weak creep condition while the transmission is set in the D/L range. In the N/P range, the connection between engine 1 and driving wheels 8 is completely cut by a forward/reverse movement switching mechanism arranged in series with the starting clutch on a driving force transmission path. Because neither a transmission path for the forward movement nor a transmission path for the reverse movement is provided in the N/P range, the driving force from engine 1 is not transmitted to driving wheels 8.

II) Conditions (1) to (4) are basic requirements for switching to the weak creep condition. Conditions (5) to (7) indicate the conditions of the vehicle before switching to the weak creep condition.

(1) Brake fluid pressure retaining means RU is normal. This is a condition because the brake fluid pressure (braking force) is not retained if the brake fluid pressure retaining means RU is out of order. Because sufficient driving force is not obtained in the weak creep condition, the vehicle will displace backwards on a slope. If the weak creep order is transmitted and driving force is switched to the weak creep condition regardless of abnormal conditions of the vehicle, e.g., one of the solenoid valves SV(A), SV(B) is not switched to the shut-off position, brake fluid pressure is not retained within the wheel cylinders WC in one false system (braking force is not retained) when the brake pedal BP is released. Therefore, if the driver releases the brake pedal BP when starting on the slope, sufficient brake fluid pressure is not retained and the vehicle undesirably rolls down the slope. Therefore, smooth starting operation without unintentional backward displacement of the vehicle is achieved by the strong creep condition.

(2) Brake switch BSW is ON. This is a condition because the driver does not intend to reduce the driving force.

(3) Positioning switch PSW selects an advance range (D/L range). This is a condition for improving the vehicle's fuel consumption while an advance range is selected. When the positioning switch PSW selects the D range, the driving force is switched to the weak creep condition, notwithstanding the position (D mode/S mode) of the mode switch MSW. However, in the R range, the driving force is not switched to the weak creep condition. This is for facilitating the steering operation of the vehicle at a garage with the vehicle kept in the strong creep condition.

(4) The vehicle speed is at 5 km/h or lower. This is a condition because the driving force of the driving wheels 8 is transmitted to engine 1 or motor 2 through the starting clutch of CVT 3 to obtain engine brake or carry out regenerative power generation by motor 2.

(5) Vehicle speed after switching to the strong creep condition>5 km/h and Vehicle speed>4 km/h. This is a condition because switching to the weak creep condition is carried out solely by deceleration due to continued brake application. Because the difference of the driving force is greater between the strong creep condition and the weak creep condition, the driver may experience undesirable strong deceleration if the driving force is switched from the strong creep condition to the weak creep condition when the brake pedal BP is depressed. Also, the vehicle may momentarily displace backwards if the vehicle stops on a slope. In such a circumstance, it is preferable not to carry out the switching operation from the strong creep condition to the weak creep condition. Therefore, once switched to the strong creep condition, the driving force is not changed to the weak creep condition until the throttle is OFF (depression of the accelerator pedal is released) over the vehicle speed of 5 km/h and the driving force is switched to the strong creep condition for driving.

The vehicle speed may decrease to 5 km/h, after being switched to the strong creep condition, without depressing the brake pedal BP even if the vehicle has sped up once over 5 km/h and then the driving force is decreased (strong creep condition for driving). For example, when the vehicle moves on an up slope, the vehicle speed may decrease without depressing the brake pedal BP. In that case, because the brake switch BSW is OFF, the driving force is switched to the strong creep condition when the vehicle speed decreases to 5 km/h. In order to cancel a successive switching operation from the strong creep condition to the weak creep condition, a further condition, i.e., vehicle speed>4 km/h is required. The switching operation to the weak creep condition is not carried out unless the brake pedal BP is depressed when the vehicle speed again decreases to 5 km/h. If the brake pedal BP is depressed (brake switch BSW [ON]) when the vehicle speed again decreases to 5 Km/h, the driving force is switched from the strong creep condition for driving to the weak creep condition. In other words, if driving force is not changed to the weak creep condition when the vehicle speed again decreases to 5 km/h (vehicle speed=5 km/h), the strong creep condition is retained as long as the vehicle speed is at or below 5 km/h.

(6) Driving force is in the weak creep condition. This is a condition because once switched to the weak creep condition, the weak creep condition is retained regardless of conditions (5) and (7). According to condition (5), the driving force is switched to the weak creep condition when the vehicle speed becomes 5 km/h. However, if the vehicle speed is less than 5 km/h, condition (5) is not satisfied. The weak creep condition is not retained solely by condition (5) if the vehicle speed is under 5 km/h. As a result, "the driving force is in the weak creep condition" is required to retain the weak creep condition when the vehicle speed under 5 km/h.

(7) Vehicle speed is 0 km/h, driving force is in the middle creep condition, and a certain time has passed after switching to the middle creep condition. This is a condition because deteriorated fuel consumption and vehicle body vibration, while the vehicle stops in the strong creep condition, are prevented with the driving force switched to the weak creep condition. The strong creep condition is retained if the driving force is not changed to the weak creep condition when the vehicle speed again decreases to 5 km/h (vehicle speed=5 km/h) (based on condition (5)), or if the vehicle speed at or below 5 km/h is retained after switching to the strong creep condition by way of releasing the brake pedal BP while being in the weak creep condition. However, if the vehicle stops in the strong creep condition with the brake pedal depressed, fuel consumption deteriorates and vehicle vibration remains. For this reason, when the vehicle stops completely (vehicle speed=0 km/h), the driving force is switched to the middle creep condition, in which driving force is between the strong creep condition and the weak creep condition, and thereafter, if a certain time has passed (300 msec in this embodiment), the driving force is further switched to the weak creep condition. Because the braking force due to depressing the brake pedal BP increases while the driving force is stepwise reduced from the strong creep condition to the middle creep condition and further to the weak creep condition, the momentary displacement of the vehicle on an up slope is made as small as possible.

Conditions Required for Strong Creep Condition for Driving

Figure 5B:
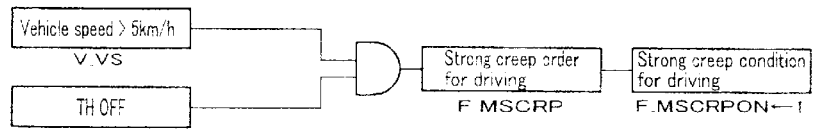
FIG. 5B shows the control logic for switching to a strong creep condition for driving.

Conditions required for strong creep condition for driving will be described. A strong creep order for driving (F_MSCRP) is transmitted when both of the following two conditions I) and II) are satisfied (FIG. 5B). The creep diving force is switched to the strong creep condition for driving after the strong creep order for driving is transmitted.

I) Vehicle speed>5 km/h.

II) Throttle is OFF (depression of the accelerator pedal is released).

These conditions are determined at the driving force control unit DCU. One reason for switching the driving force to the strong creep condition for driving is to prevent a strong deceleration of the vehicle before stopping due to the switching operation from the strong creep condition to the weak creep condition. Another reason is to prevent momentary backward displacement of the vehicle on an up slope while the vehicle stops. The driving force is switched to the strong creep condition for driving, which is weaker than the strong creep condition, in advance of switching to the weak creep condition.

Each of the above conditions will be described.

I) Vehicle speed>5 km/h. This is a condition because the switching operation from the strong creep condition to the weak creep condition is carried out when the vehicle speed is once over 5 km/h after the strong creep condition and then the vehicle speed becomes 5 km/h. This is also for discriminating between the strong creep condition at a vehicle speed of 5 km/h or lower and the strong creep condition for driving over the vehicle speed of 5 km/h.

II) Throttle is OFF (TH OFF). This is a condition because the driver does not intend a further increment of the driving force, the driving force may be decreased without any problems.

Conditions Required for Middle Creep Condition

Figure 5C:
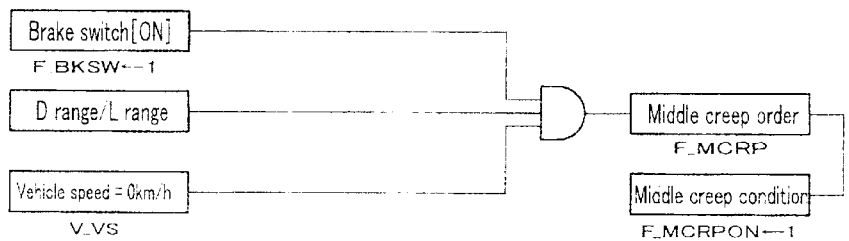
FIG. 5C shows the control logic for switching to a middle creep condition.

Conditions required for the middle creep condition will be described. As shown in FIG. 5C, when the following three conditions I), II) and III) are satisfied, a middle creep order (F_MCRP) is transmitted.

I) Brake switch BSW is ON.

II) Positioning switch PSW selects an advance range (D/L range).

III) Vehicle is stopped (vehicle speed=0 km/h).

These conditions are determined at the driving force control unit DCU. The strong creep condition is retained if the driving force is not changed to the weak creep condition when the vehicle speed decreases again to 5 km/h (vehicle speed=5 km/h) or if the vehicle speed at 5 km/h or lower is retained after switching to the strong creep condition by releasing the brake pedal BP while being in the weak creep condition. However, if the vehicle continues to stop in the strong creep condition, fuel consumption deteriorates and vehicle vibration continues. For this reason, the middle creep condition is required. As previously mentioned, in order to prevent momentary backward displacement of the vehicle, which is due to switching from the strong creep condition to the weak creep condition while the vehicle stops, the driving force is switched to the middle creep condition.

The above conditions required for the middle creep order will be described.

I) Brake switch BSW is ON. This is a condition because the driver does not intend to reduce the driving force when the brake pedal BP is not depressed.

II) Positioning switch PSW selects an advance range (D/L range). This is a condition for switching to the middle creep condition while an advance range is selected because the driving force is switched to the weak creep condition while the positioning switch is set to the D or L range. Switching to the middle creep condition is not necessary in the N/P range because the weak creep condition is selected as soon as the transmission is switched. Also, switching to the middle creep condition is not necessary in the R range because the strong creep condition is retained in the R range.

III) Vehicle is stopped (vehicle speed=0 km/h). This is a condition because the driving force is switched to the weak creep condition in order to prevent deteriorated fuel consumption and vehicle vibration while the vehicle stops in the strong creep condition. The middle creep condition is required as a transitional condition to the weak creep condition.

A determination of whether or not the driving force is in the weak creep condition, strong creep condition for driving or the middle creep condition, is made based on the hydraulic pressure command value to the starting clutch of CVT 3.

Conditions for Automatically Stopping the Engine

Figure 6:
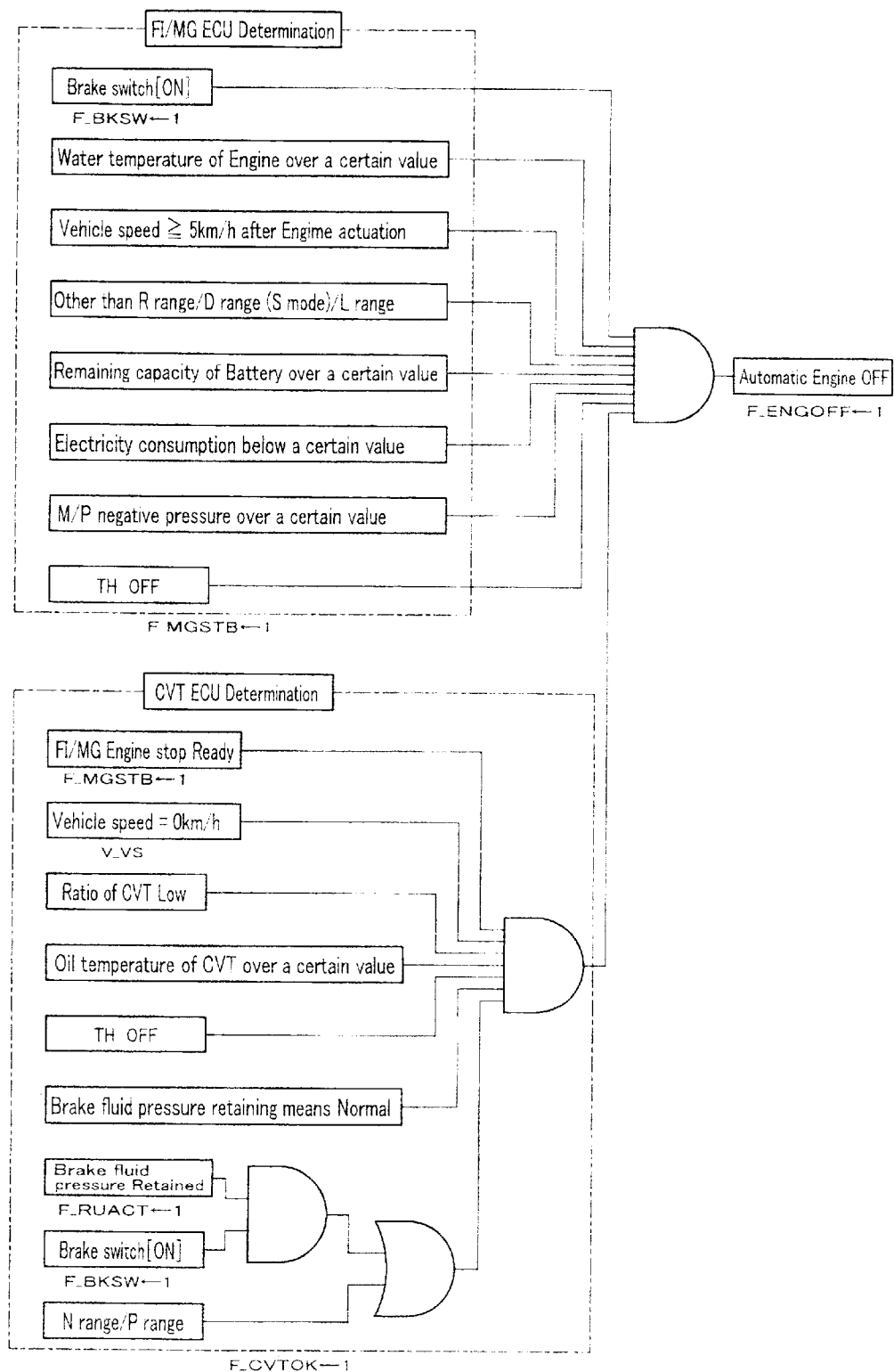
FIG. 6 shows the control logic of a driving motor stopping unit according to a preferred embodiment of the invention, in which the engine is automatically stopped.

For the purpose of further improving fuel consumption, engine 1 is automatically stopped while the vehicle stops. Conditions for automatically stopping engine 1 will be described. When all the conditions shown in FIG. 6 are satisfied, an engine stop order (F_ENGOFF) is transmitted and engine 1 is automatically stopped. The automatic engine stop operation of engine 1 is carried out by the driving motor stopping unit. Therefore, the following automatic engine stop conditions are determined at the driving motor stopping unit. Specifically, the automatic engine stop conditions are determined at FI/MG ECU 4 and CVT ECU 6. When FI/MG ECU 4 determines that all the following conditions I) to VIII) are satisfied, F_MGSTB becomes 1. When CVT ECU 6 determines that all the following conditions IX) to XV) are satisfied, F_CVTOK becomes 1.

Each of the automatic engine stop conditions will be described.

I) Brake switch BSW is ON. This is a condition for warning the driver. The driver places his foot on the brake pedal BP when the brake switch BSW is ON. Therefore, if engine 1 is stopped and the driving force is lost, the driver can easily increase a brake pedal load before the vehicle undesirably displaces backwards on a slope.

II) Water temperature of the engine is over a certain value. This is a condition because the stop/actuation operation of engine 1 should be carried out when engine 1 is in stable conditions. In a cold area, if the water temperature is low, engine 1 may not restart.

III) Vehicle speed reaches 5 km/h once after engine actuation. This is a condition for facilitating a steering operation at a garage while the vehicle moves in creep running. The steering operation at a garage will be time-consuming if engine 1 is stopped whenever the vehicle stops for changing steering directions.

IV) Positioning switch PSW and Mode switch MSW select other than the R range/D range (S mode)/L range, i.e., the N range/D range (D mode)/P range is selected. This is a condition for the following reasons. A steering operation at a garage while selecting the R or L range will be time-consuming if engine 1 is stopped whenever the vehicle stops for changing steering directions. When the positioning switch PSW selects the D range and the mode switch MSW selects S the mode, the driver is expecting the vehicle to perform a quick start operation.

V) Capacity of the battery is over a certain value. This is a condition because if the remaining capacity of the battery is not enough to restart engine 1, the motor cannot actuate engine 1 after stopping the engine.

VI) Electricity consumption is below a certain value. This is a condition for securing sufficient electrical supply to loads.

VII) Load of the constant pressure chamber of the master power MP is over a certain value. This is a condition because the smaller negative pressure in the constant pressure chamber of the master power MP, the smaller amplification of the brake load when depressing the brake pedal BP, leads to deteriorated braking performance. Because negative pressure in the constant pressure chamber is obtained from the intake pipe of engine 1, negative pressure in the constant pressure chamber becomes far smaller if engine 1 is stopped at smaller negative pressures. This leads to reduced amplification of the brake load when the driver depresses the brake pedal BP, and hence results in deteriorated braking performance.

VIII) Accelerator pedal is not depressed (TH OFF). This is a condition because the driver does not intend further increase of the driving force, engine 1 may be automatically stopped.

IX) All the automatic engine stop conditions at FI/MG ECU 4 are satisfied. This is a condition because if all the engine stop conditions determined at FI/MG ECU 4 are not satisfied, it is not preferable to carry out the automatic engine stop operation.

X) Vehicle speed is 0 km/h. This is a condition because the driving force is not required when the vehicle stops.

XI) Ratio of the CVT is low. This is a condition because a smooth starting operation of the vehicle is not carried out unless the ratio of the CVT (pulley ratio) is low.

XII) Oil temperature of the CVT is over a certain value. This is a condition because if the oil temperature of the CVT 3 is low, the start-up for hydraulic pressure of the starting clutch will cause a delay. Therefore, the required time from the engine actuation to the strong creep condition is extended, and the vehicle will displace backwards on a slope.

XIII) Accelerator pedal is not depressed (TH OFF). This is a condition because if the driver does not intend the further increment the driving force, engine 1 may be automatically stopped.

XIV) Brake fluid pressure retaining means RU is normal. This is a condition because the brake fluid pressure may not be retained if the brake fluid pressure retaining means RU (RU(A) or RU(B)) is out of order, therefore, the strong creep condition is kept for preventing the vehicle from undesirable backward displacement.

XV) (1) Brake fluid pressure is retained (solenoid valve SV in shut-off position) and Brake switch BSW is ON or (2) Positioning switch PSW selects N range/P range. This is a condition for the following reasons:

(1) As long as the brake fluid pressure is retained, the vehicle does not displace backwards on a slope even if engine 1 is automatically stopped and the driving force is lost. Further, when the brake switch BSW is ON, the driver places his foot on the brake pedal BP. Therefore, if engine 1 is stopped and the driving force is lost, the driver can easily increase a brake pedal load before the vehicle undesirably displaces backwards on a slope.

(2) If the vehicle stops with the positioning switch PSW selecting the P or N range, the driver intends to pull up the vehicle. Therefore, engine 1 may be automatically stopped. In this condition, engine 1 is automatically stopped even if the solenoid valves SV(A), SV(B) are not actuated.

Conditions for Releasing Retained Brake Fluid Pressure

Figure 7A:
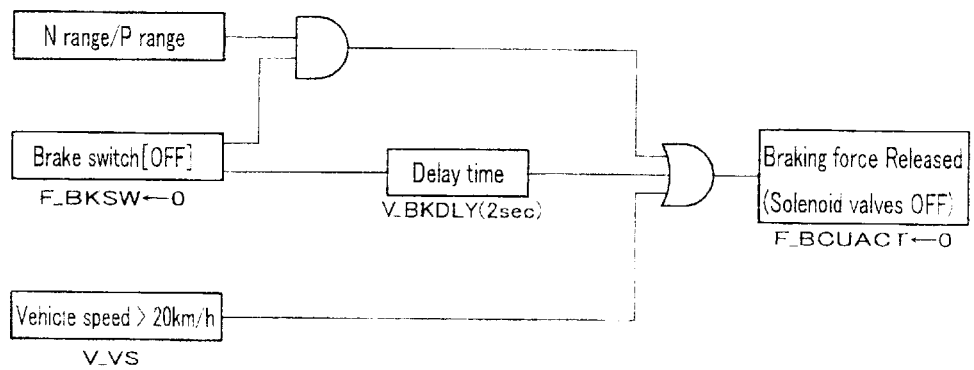
FIG. 7A shows the logic for releasing the retained brake fluid pressure.

Conditions under which the brake fluid pressure retaining means RU releases the retained brake fluid pressure will be described. As shown in FIG. 7A, the brake fluid pressure is released when any of the following conditions is satisfied:

I) Positioning switch PSW selects N range/P range and Brake switch BSW is OFF;

II) A certain delay time has passed after Brake switch BSW becomes OFF; or

III) Vehicle speed is over 20 km/h.

When any of the above conditions is satisfied, the solenoid valve SV is switched to the communicating position for releasing the retained brake fluid pressure.

Each of the above conditions will be described.

I) Positioning switch PSW selects N/P range and Brake switch BSW is OFF. This is a condition for eliminating unnecessary operation of the braking apparatus BU for vehicles (brake fluid pressure retaining means RU).

II) A certain delay time has passed after Brake switch BSW becomes OFF. This is a condition because it is not preferable, as a fail-safe measure that the braking force be permanently retained after releasing the brake pedal BP because brake dragging occurs. In the preferred embodiment, the delay time is about 2 seconds after releasing the brake pedal BP, i.e. after the brake switch BSW is OFF.

III) Vehicle speed is over 20 km/h. This is a condition for eliminating unnecessary brake dragging as a fail-safe measure.

Figure 7B:
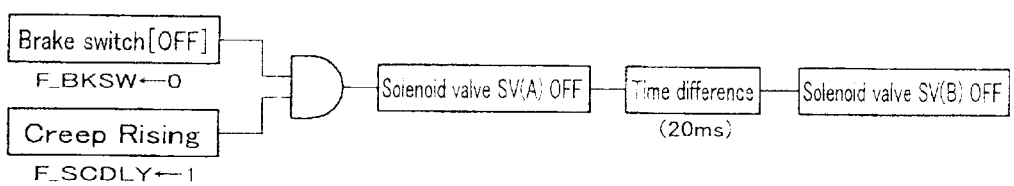
FIG. 7B shows the logic for releasing the retained brake fluid pressure in a time differential manner.

As shown in FIG. 7B, the retained brake fluid pressure is released in the following condition. In this event, release of the brake fluid pressure is carried out in a time differential manner.

I) Creep driving force has risen and Brake switch BSW is OFF.

When this condition is satisfied, the solenoid valve SV(A) first turns to the shut-off position. And after a time-lag, the solenoid valve SV(B) turns to the shut-off position. Accordingly, the release of the retained brake fluid pressure is carried out in a time differential manner.

"Creep driving force has risen and Brake switch BSW is OFF" is a condition because undesirable backward displacement of the vehicle on an up slope can be prevented in consideration of the generated starting driving force, the inertial force and the rolling resistance (viz. even if the vehicle slightly displaces backwards, undesirable backward displacement of the vehicle can be restricted to a minimum amount by the increasing starting driving force). This is also a condition because a smooth start of the vehicle without a sudden feel can be achieved on a down slope, and on a slippery road surface, such as an icy road, a smooth start of the vehicle can be achieved by restricting slippage or idle spin of the driving wheels.

Requirement for Creep Rising Condition

Figure 7C:
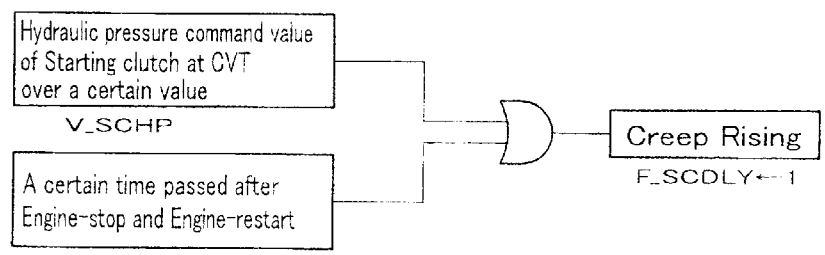
FIG. 7C shows the logic for determining a creep rising condition.

The requirement for a creep rising condition will be described. As shown in FIG. 7C, when any of the following conditions I) and II) is satisfied, the creep diving force is considered to have risen.

I) Hydraulic pressure command value of the starting clutch at CVT 3 is over a certain value.

II) A certain time has passed after engine 1 is automatically stopped and then restarted.

These two conditions are determined at the driving force control unit DCU.

The above conditions required for the creep rising condition will be described.

I) Hydraulic pressure command value of the starting clutch at CVT3 is over a certain value. This is a condition because when the hydraulic pressure command value of the starting clutch at CVT 3 is over a certain value, the driving force has been increased to such an extent that backward displacement of the vehicle is prevented for the reason mentioned above. Therefore, backward displacement of the vehicle is prevented even if brake fluid pressure is released. "The hydraulic pressure command value over a certain value" indicates that the hydraulic pressure command value—it is transmitted to the linear solenoid valve, which controls hydraulic pressure for the engaging force of the starting clutch—has been increasing substantially to a value halfway between the weak creep condition and the strong creep condition, in the process of switching from the weak creep condition to the strong creep condition.

II) A certain time has passed after the engine 1 is automatically stopped and then restarted. This is a condition because the driving force has been generated to such an extent that a smooth start of the vehicle is carried out on an up or down slope and a slippery road surface, even after releasing the retained brake fluid pressure. Time-counting is initiated when engine 1 is automatically restarted and the supply of pressure oil to the starting clutch is started. Hydraulic oil has been discharged from the oil pressure chamber of the starting clutch at CVT 3 while engine 1 is stopped. Therefore, a clearance or play exists for the advance stroke of the piston enforcing the clutch when engine 1 is actuated and supply of the pressure oil is initiated. For this reason, the hydraulic pressure command value to the linear solenoid valve of the starting clutch does not correspond to the actual hydraulic pressure value (driving force transmission capacity). When increasing the driving force from the engine stop condition, it is impossible to judge the creep rising condition based on the hydraulic pressure command value of the starting clutch. As a result, the creep rising condition is determined when a timer counts a certain period of time after the supply of the pressure oil to the starting clutch is initiated. A certain time is determined based on experimental results or simulation results. However, in this embodiment, the certain time is determined to be the time that the starting driving force increases substantially to the middle value between the weak creep and the strong creep.

Conditions Required for Strong Creep Order

Figure 8A:
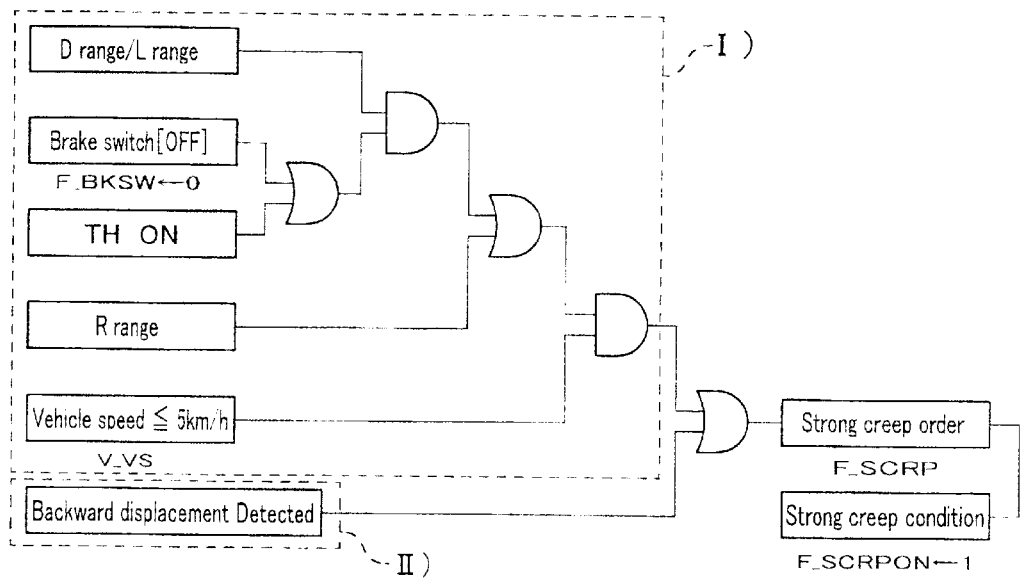
FIGS. 8A and 8B show the control logic for switching to the strong creep condition. Here.
Figure 8B:
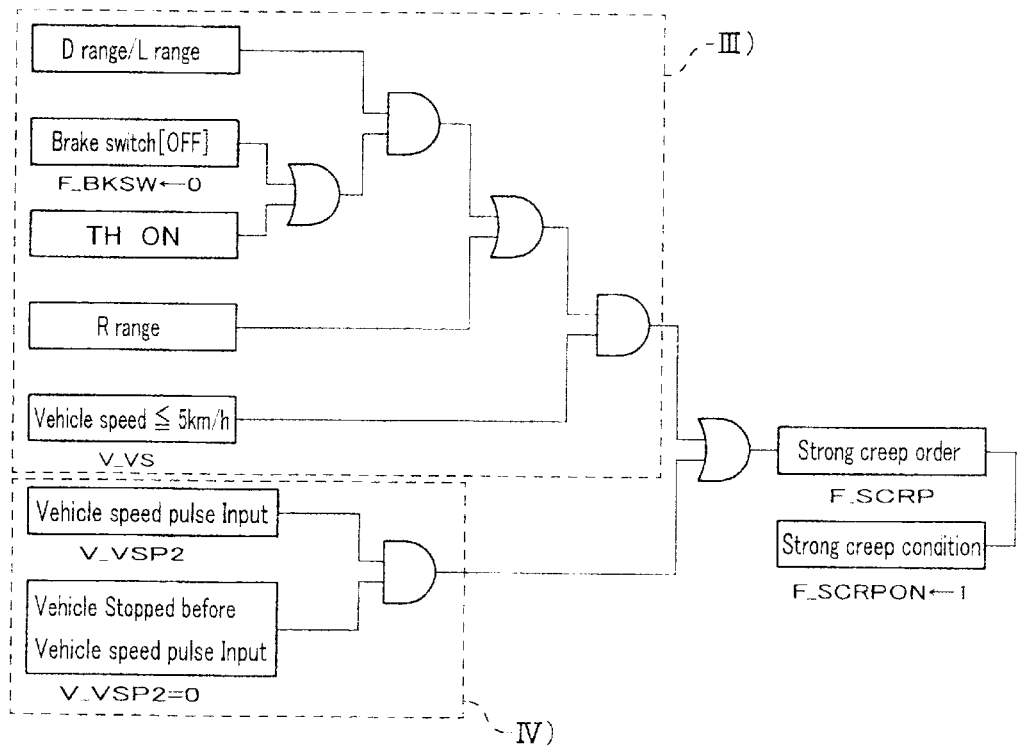

Conditions for a strong creep order will be described. The strong creep order (F_SCRP) is transmitted when any of the following two conditions shown in FIGS. 8A and 8B is satisfied. The first condition required for the strong creep order is that either I) or II) is satisfied (FIG. 8A).

I) [(1) Brake switch BSW is OFF or Throttle is ON, and Positioning switch PSW selects an advance range (D/L rage) or (2) Positioning switch PSW selects the reverse (R) range] and (3) Vehicle speed is at 5 km/h or lower.

II) Backward displacement of the vehicle is detected.

Meanwhile, the second condition required for the strong creep order is that either III) or IV) is satisfied (FIG. 8B).

III) [(1) Brake switch BSW is OFF or Throttle is ON, and Positioning switch PSW selects an advance range (D/L range) or (2) Positioning switch PSW selects the reverse (R) range] and (3) Vehicle speed is at 5 km/h or lower.

IV) Vehicle speed pulse is input and Vehicle is fully stopped before the input of vehicle speed pulse.

In the first and the second conditions required for the strong creep order, I) and III) are identical, while II) and IV) are different. Therefore, explanation of the condition III) is omitted. Conditions I) to IV) are determined at the driving force control unit DCU.

Each of the above conditions will be described below.

First, (1) to (3) of condition I) will be described. However, because they are identical to those of the condition III), an explanation is omitted with regard to (1) to (3) of condition III).

(1) Brake switch BSW is OFF or Throttle is ON, and Positioning switch PSW selects an advance range (D/L rage). This is a condition because when the driver initiates a starting operation, the driving force is changed to the strong creep condition. The driver intends to start the vehicle because the positioning switch PSW is set to the D or L range and further depression of the brake pedal BP is released or instead, the accelerator pedal is depressed. Therefore, the driving force is switched from the weak creep condition to the strong creep condition.

When the accelerator pedal is depressed, the driving force transmission capacity increases, even after reaching the greater driving force transmission capacity, to a capacity that allows transmission of all the driving force generated at the driving motor (condition greater than the greater driving force transmission capacity). However, the flag indicating the strong creep condition (F_SCRPON) is kept until another flag rises.

(2) Positioning switch PSW selects the reverse (R) range. This is a condition for ensuring smooth creep driving in R range. When the positioning switch PSW is set to the R range, the driver expects a steering operation at a garage with the driving force switched to the strong creep condition. Therefore, the driving force is switched from the weak creep condition to the strong creep condition.

(3) Vehicle speed at 5 km/h or lower. This is a condition because the strong creep condition for driving at a vehicle speed over 5 km/h can be distinguished from the strong creep condition at a vehicle speed of 5 km/h or lower.

II) Backward displacement of the vehicle is detected. When the vehicle starts to displace backwards on a steep slope with the backward displacement force derived from the vehicle's own weight being greater than the braking force, the driving force in the strong creep condition prevents the backward displacement of the vehicle. When the vehicle stops on an up slope, the total amount of the driving force in the weak creep condition (driving force is zero if engine 1 is automatically stopped) and the braking force resists the backward displacement force of the vehicle. However, because the greater the inclination angle of the slope, the greater backward displacement force, the vehicle starts to displace backwards on the steep slope with the backward displacement force being greater than the total amount of the driving force in the weak creep condition and the braking force. For this reason, when backward displacement of the vehicle is detected, the driving force is switched from the weak creep condition to the strong creep condition in any circumstances to generate sufficient driving force against the slope.

Figure 10A:
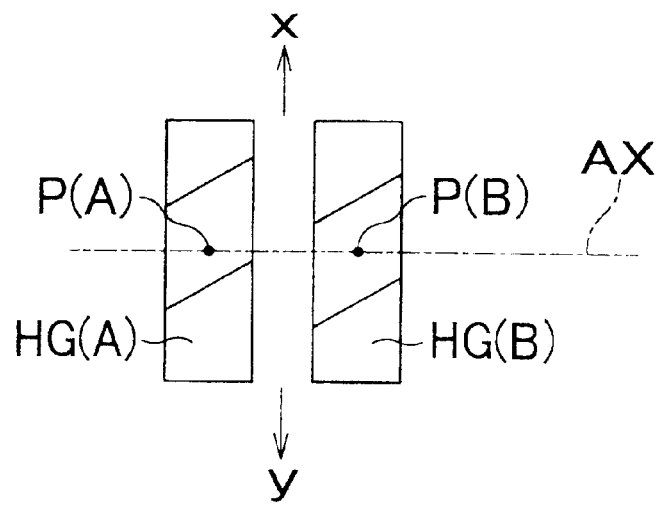
FIG. 10A shows a construction thereof.
Figure 10B:
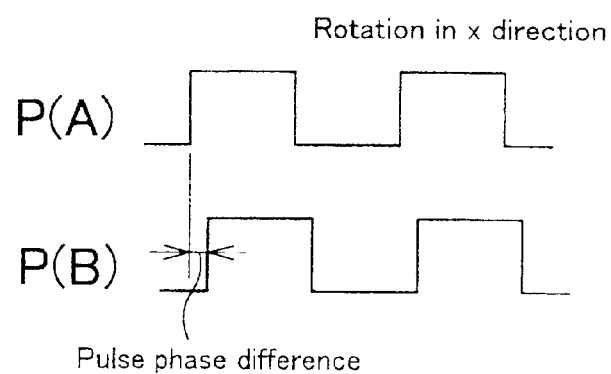
FIG. 10B shows a pulse phase for x direction of FIG. 10A.
Figure 10C:
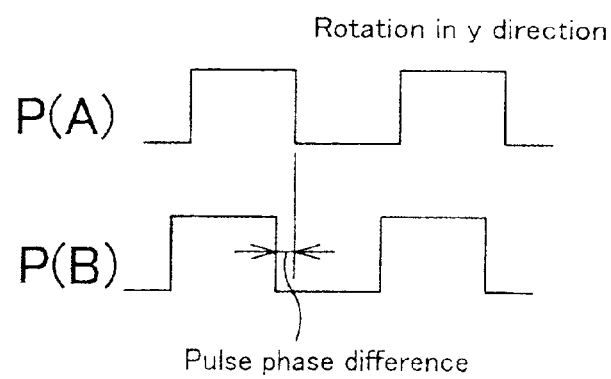
FIG. 10C shows a pulse phase for y direction of FIG. 9A.

With reference to FIG. 10, means for detecting backward displacement of the vehicle will be described. For example, helical gears HG(A), HG(B) are provided downstream of the starting clutch of CVT 3. The helical gears HG(A), HG(B) may be provided at any position as long as they are rotatable with the tires. As shown in FIG. 10A, gear teeth of the helical gears HG(A), HG(B) are positioned in helical and diagonal relation around the periphery of the gear. The phase of the gear teeth shifts with the rotation of the helical gears HG(A), HG(B) in x and y directions. To this end, electromagnetic pick-ups P(A), P(B) are provided on the respective helical gears HG(A), HG(B) to align in the same axis AX of the helical gears. The electromagnetic pick-ups P(A), P(B) detect the front ends of the gear teeth. The direction of the rotation is obtained from the pulse phase difference based on the two pulses detected at the electromagnetic pick-ups P(A), P(B). As best seen in FIG. 10B, when the helical gears HG(A), HG(B) rotate to the x direction, the pulse detected at the electromagnetic pick-up P(B) shifts back from that detected at the electromagnetic pick-up P(A). In other words, the front ends of the gear teeth of the helical gear HG(A) are detected before those of the gear teeth of the helical gear HG(B). Meanwhile, when the helical gears HG(A), HG(B) rotate to the y direction, the pulse detected at the electromagnetic pick-up P(B) shifts forward to that detected at the electromagnetic pick-up P(A) (FIG. 10C). In other words, the front ends of the gear teeth of the helical gear HG(A) are detected after those of the gear teeth of the helical gear HG(B). The direction of the rotation is therefore detected by the pulse phase difference. Rotation in the x direction indicates backward displacement of the vehicle. Backward displacement is detected by the relative positions of the two pulses obtained from the electromagnetic pick-ups P(A), P(B) mentioned above. As long as there is a phase difference, any known gears other than helical gears HG(A), HG(B) may be employed.

IV) A vehicle speed pulse is input and the vehicle is fully stopped before the input of the vehicle speed pulse. This is a condition for the following reason. When the vehicle displaces from the fully stopped position, backward displacement (possible backward displacement) of the vehicle is detected and then the driving force is switched to the strong creep condition to keep the vehicle against the slope. Although displacement of the vehicle is detected, a determination is not carried out to specify the direction as to whether the vehicle moves forward or backwards. When the vehicle stops on an up slope, the total amount of driving force in the weak creep condition (driving force is zero if engine 1 is automatically stopped) and braking force resists the backward displacement force of the vehicle. However, because the greater the inclination angle of the slope, the greater the backward displacement force, the vehicle starts to displace forward (on a down slope) or backwards (on an up slope) with the displacement force derived from the vehicle's own weight being greater than the total amount of the driving force in the weak creep condition and the braking force. For this reason, when forward or backward displacement (i.e. displacement) of the vehicle is detected, the driving force is switched from the weak creep condition to the strong creep condition to generate sufficient driving force against the slope. For the purpose of the detecting that the vehicle stops completely, the vehicle speed pulse of zero is detected before a vehicle speed pulse is input. Displacement of the vehicle is detected even from one vehicle speed pulse input.

The driving force may be switched to the strong creep condition even if the vehicle displaces in the same direction in which the driver intends to move.

Conditions for Automatically Actuating the Engine

Figure 9B:
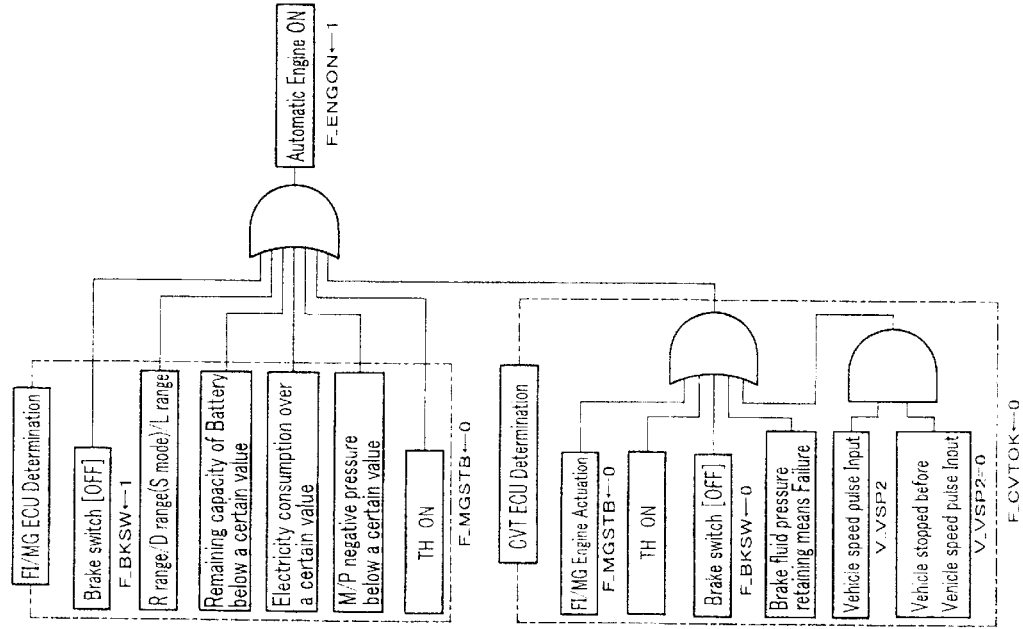
FIGS. 9A and 9B show the control logic for automatically actuating the engine. Here.
Figure 9A:
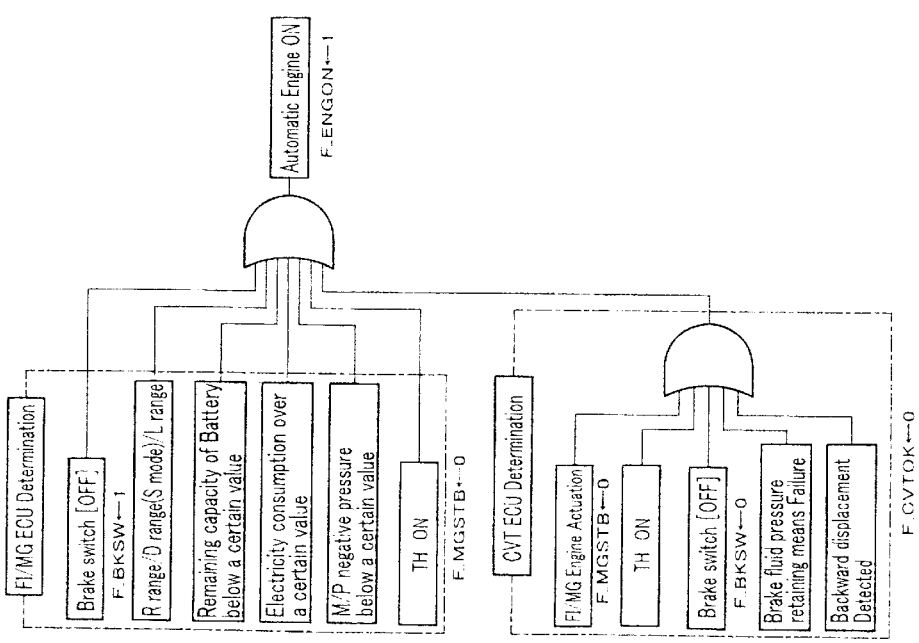

After automatically stopping engine 1, engine 1 is automatically restarted in the following conditions. When any of the following conditions shown in FIGS. 9A and 9B is satisfied, an automatic engine actuation order (F_ENGON) is transmitted and engine 1 is automatically actuated. The automatic engine actuation is carried out by the driving motor stopping unit. Therefore, the following automatic engine actuation conditions are determined at the driving motor stopping unit. Specifically, the automatic engine actuation conditions are determined at FI/MG ECU 4 and CVT ECU 6. When FI/MG ECU 4 determines that any of the following conditions I) to VI) is satisfied, F_MGSTB becomes 0. When CVT ECU 6 determines that any of the following conditions VII) to XI) [or VII] to X] and XII]] is satisfied, F_CVTOK becomes 0. The first condition required for the automatic engine actuation order (shown in FIG. 9A) is the same as the second condition shown in FIG. 9B, except for the conditions XI) and XII) which are determined by CVT ECU 6. Therefore, the explanation refers only to the difference as to the second condition thereof.

I) Depression of the brake pedal BP is released (Brake switch BSW is OFF). This is a condition because the determination of the starting operation is carried out when the driver releases the brake pedal BP. When the driver releases the brake pedal BP in the D range/D mode, it is assumed that the driver initiates the starting operation. Therefore, engine 1 is automatically actuated. Meanwhile, when the driver releases the brake pedal BP in P or N range to stop and exit the vehicle, engine 1 is automatically actuated in order to remind the driver not to exit the vehicle without turning off the ignition switch.

II) Positioning switch PSW and Mode switch MSW select R range/D range (S mode)/L range. This is a condition because the driver intends to start the vehicle quickly if the transmission is set in the R range/D range (S mode)/L range after engine 1 is stopped. Therefore, when engine 1 is stopped with the transmission set in other than the R range/D range (S mode)/L range and thereafter switched to the R range/D range (S mode)/L range, engine 1 is automatically actuated.

III) Remaining capacity of the battery is below a certain value. This is a condition because engine 1 is not automatically actuated if the remaining capacity of the battery is too low. Engine 1 is not stopped unless the remaining capacity of the battery is above a certain value. However, the capacity of the battery may lower after engine 1 is automatically stopped. In this case, engine 1 is automatically actuated for the purpose of charging the battery. The certain value is set to be higher than the critical battery capacity, below which engine 1 is not actuated.

IV) Electricity consumption is above a certain value. While components that consume electricity, such as lights, are on, the capacity of the battery decreases quickly. As a result, engine 1 will not be restarted. For this reason, irrespective of the remaining capacity of the battery, engine 1 is automatically actuated when the electricity consumption is above a certain value.

V) Negative pressure of the master power MP is below a certain value. This is a condition because the lower the negative pressure at the master power MP, the lower the obtained braking force. Therefore, engine 1 is restarted to secure sufficient braking force.

VI) Accelerator pedal is depressed (TH ON). This is a condition because the driver is expecting driving force from engine 1. Therefore, engine 1 is automatically actuated when the accelerator pedal is depressed.

VII) Automatic engine actuation condition at FI/MG ECU 4 is satisfied. This is a condition because CVT ECU 6 also determines the automatic engine actuation conditions of FI/MG ECU 4.

VIII) Accelerator pedal is depressed (TH ON). This is a condition because the driver is expecting driving force from engine 1. Therefore, engine 1 is automatically actuated when the accelerator pedal is depressed.

IX) Depression of the brake pedal BP is released (Brake switch BSW is OFF). This is a condition because determination of the starting operation is carried out when the driver releases the brake pedal BP. When the driver releases the brake pedal BP in the D range/D mode, it is assumed that the driver initiates the starting operation. Therefore, engine 1 is automatically actuated.

X) Brake fluid pressure retaining means RU is out of order. This a condition because when the brake fluid pressure retaining means RU(A) or RU(B) is out of order and the brake fluid pressure is not retained, the vehicle displaces backwards (forward) on a slope with the automatic engine stop operation. Therefore, when the brake fluid pressure retaining means RU is out of order, engine 1 is automatically actuated and the vehicle is kept in the strong creep condition.

If a failure is detected in the brake fluid pressure retaining means RU after stopping engine 1, engine 1 is immediately actuated such that the driving force of the vehicle is kept in the strong creep condition. This is because the brake fluid pressure may not be retained after releasing the brake pedal BP upon starting the vehicle. In other words, it is the strong creep condition that prevents the vehicle from undesirable backward displacement and facilitates a smooth starting operation of the vehicle. The failure-detecting unit DU detects a malfunction of the brake fluid pressure retaining means RU.

XI) Backward displacement of the vehicle is detected. This is a condition because when the vehicle starts to displace backwards on a steep slope with the backward displacement force derived from the vehicle's own weight being greater than braking force, the vehicle is prevented from backward displacement by the driving force of engine 1. When the vehicle stops on an up slope, the braking force resists the backward displacement force of the vehicle. However, because the greater the inclination angle of the slope the greater the backward displacement force, the vehicle starts to displace backwards on the steep slope with the backward displacement force being greater than the braking force. For this reason, when backward displacement of the vehicle is detected, the driving force is switched from the engine stop condition to the strong creep condition in any circumstances to generate sufficient driving force against the slope. Because the method of detecting backward displacement of the vehicle has been explained in Conditions required for Strong Creep Order section, further explanation will be omitted.

XII) A vehicle speed pulse is input and the vehicle is fully stopped before the input of the vehicle speed pulse. This is a condition for the following reason. When the vehicle displaces from the fully stopped position, backward displacement (possible backward displacement) of the vehicle is detected and then engine 1 is automatically actuated to generate driving force against the slope. Although displacement of the vehicle is detected, a determination is not carried out to specify the direction as to whether the vehicle moves forward or backwards. When the vehicle stops on an up slope with engine 1 stopped, only the braking force resists the backward displacement force of the vehicle. However, because the greater the inclination angle of the slope, the greater the backward displacement force, the vehicle starts to displace forward (on a down slope) or backwards (on an up slope) with the displacement force derived from the vehicle's own weight being greater than the braking force. For this reason, when forward or backward displacement (i.e. displacement) of the vehicle is detected, engine 1 is automatically actuated so as to generate sufficient driving force in the strong creep condition. For the purpose of detecting that the vehicle stops completely, the vehicle speed pulse of zero is detected before a vehicle speed pulse is input. Displacement of the vehicle is detected even from one vehicle speed pulse input.

Time Chart for Control

With reference to two time charts shown in FIGS. 11 and 12, the way of controlling the vehicle according to the preferred embodiments will be described. The vehicle is running.

Time Chart for Control with Automatic Engine Stop Operation

Figure 11:
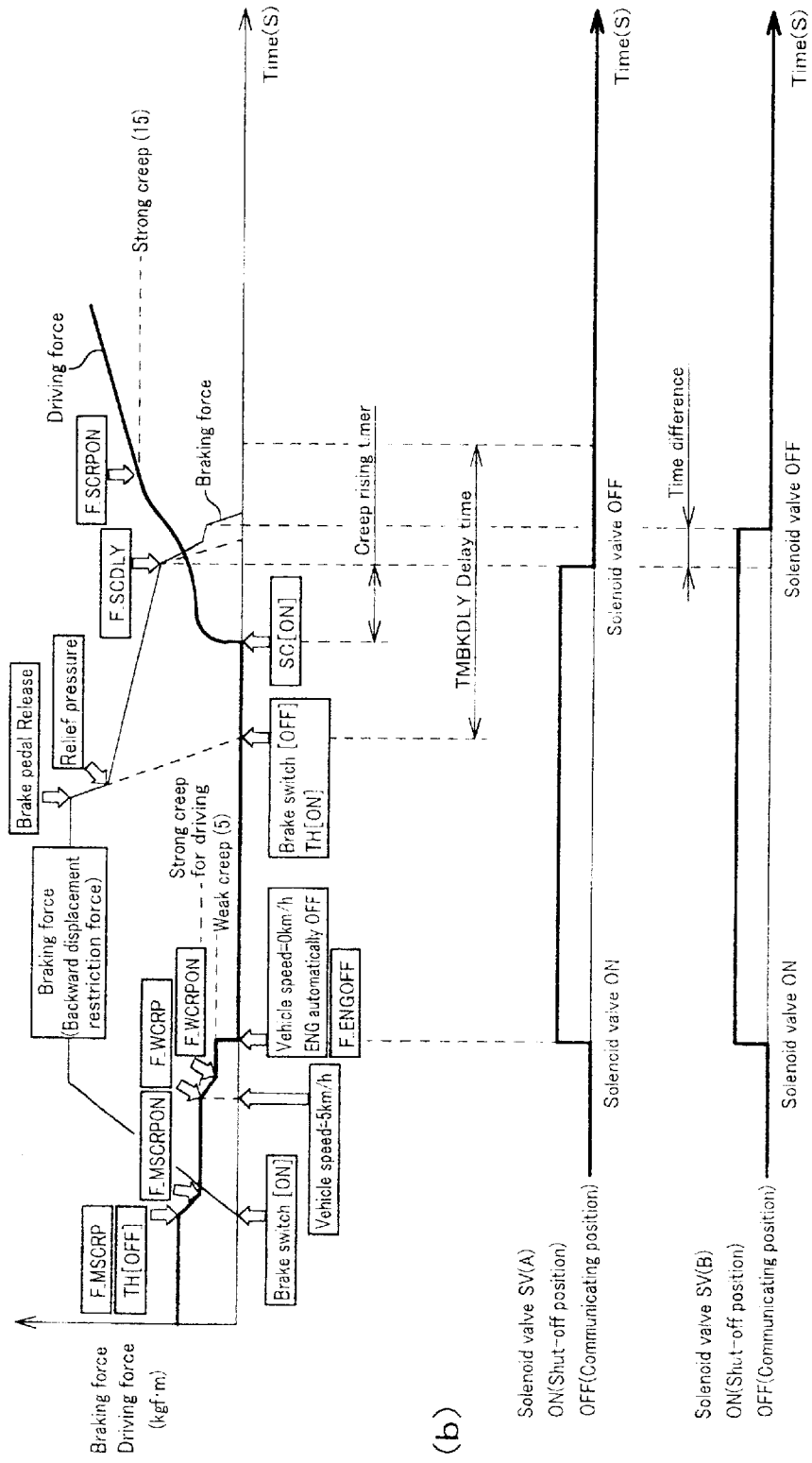
FIG. 11 is a time chart for the control of the vehicle provided with a braking apparatus according to the present invention, in which the engine is automatically stopped. Here, (a) indicates the relationship (increase or decrease) between driving force and braking force, and (b) indicates the conditions (ON/OFF) of solenoid valves.

With reference to FIG. 11, control of the vehicle will be described. The vehicle having the above system is operated in the order of braking, stopping and starting. In this operation, the driving force is decreased from the strong creep condition for driving to the weak creep condition by the driving force control unit DCU, and thereafter engine 1 is stopped by the driving motor stopping unit. The vehicle is supposed to stop on a slippery up slope. The positioning switch PSW and the mode switch MSW of the vehicle are not changed from the D range/D mode. The brake fluid pressure retaining means RU comprises a relief valve RV.

In the time chart of FIG. 11($a$), the processes of increasing and decreasing the driving force of the vehicle are shown in the sequence order. A thick line indicates the driving force and a thin line indicates the braking force. In the time chart of FIG. 11(b), ON/OFF (shut-off position/communicating position) of the solenoid valve SV(A) is shown above, and ON/OFF (shut-off position/communicating position) of the solenoid valve SV(B) is shown below.

The driving force control unit DCU transmits a strong creep order for driving (F_MSCRP) when the driver releases the accelerator pedal while the vehicle is running (vehicle speed>5 km/h). The driving force is then switched to the strong creep condition for driving (F_MSCRPON), which is less than the strong creep condition (F_SCRPON).

If the driver releases the accelerator pedal and depresses the brake pedal BP (brake switch BSW is ON), the brake fluid pressure that is the braking force increases. When the vehicle speed falls to 5 km/h with continued braking application, the driving force control unit DCU transmits a weak creep order (F_WCRP) and driving force is switched to the weak creep condition (F_WCRPON). When doing so, because the driving force decreases to the weak creep condition through the strong creep condition for driving, the driver does not experience a strong deceleration.

When the vehicle speed falls to 0 km/h, the control unit CU of the braking apparatus BU for vehicle switches the solenoid valves SV(A) and SV(B) to the shut-off position (ON) to retain brake fluid pressure (braking force). Further, the driving motor stopping unit automatically stops engine 1 (F_ENGOFF) and the driving force is lost. Because engine 1 is stopped through the weak creep condition, the driver has depressed the brake pedal BP to such an extent that the vehicle does not roll back on a slope. Therefore, the vehicle can be stopped on a slope (backward displacement restriction force), even if engine 1 is automatically stopped and the driving force is lost. Engine 1 is automatically stopped for the purposes of improved fuel consumption as well as reducing of exhaust gas.

The driver then releases the brake pedal BP in order to prepare for restarting the vehicle. If the diver depresses the brake pedal BP more than a preset pressure of the relief valve RV (relief pressure), the relief valve RV actuates upon the driver releasing the brake pedal BP and brake fluid pressure (braking force) immediately decreases to the relief pressure. Providing the relief valve RV ensures a smooth starting operation of the vehicle on a slope, even if the driver depresses the brake pedal BP more than is required.

When the brake fluid pressure within the wheel cylinder WC falls below the relief pressure, the brake fluid pressure gradually decreases by the operation of the solenoid valve SV and the restriction D of the brake fluid pressure retaining means RU. Accordingly, the braking force gradually decreases. Backward displacement of the vehicle is restricted by the braking force being gradually reduced but still retained.

While the brake fluid pressure and the braking force gradually increase, releasing the brake pedal BP turns the brake switch BSW OFF, thereby the driving motor stopping unit transmitting an automatic engine actuation order (F_ENGON). After a time lag derived from a delay of signal communication and mechanisms, engine 1 is automatically actuated and the supply of pressure oil to the starting clutch at CVT 3 is initiated (SC[ON]). Driving force thereby increases.

Hydraulic oil has been discharged from the oil pressure chamber of the starting clutch at CVT 3 while engine 1 is stopped. Therefore, when engine 1 is actuated and the supply of pressure oil to the starting clutch is initiated, the driving force suddenly rises (sudden rise of the driving force at SC [ON]) due to resistance of a piston enforcing the clutch. Further, a clearance or play exists for the advance stroke of the piston while engine 1 is stopped because hydraulic oil has been discharged. Therefore, the hydraulic pressure command value to the starting clutch does not correspond to the actual hydraulic pressure value; hence the driving force transmission capacity of the starting clutch increases little by little until the oil pressure chamber is filled with hydraulic oil. As a result, the driving force gradually increases, and when the oil pressure chamber is filled with hydraulic oil, the driving force then increases in accordance with the hydraulic pressure command value.

The control unit CU of the braking apparatus BU for vehicles firstly turns off the solenoid valve SV(A) (communicating position) at A system to release the brake fluid pressure (FIG. 11(b) above) during the process of increasing the driving force to the strong creep condition (F_SCDLY). With this operation, the brake fluid pressure (braking force) retained at A system is lost, and the braking force acting on the vehicle decreases to almost a half extent. At this point of time, backward displacement of the vehicle is restricted by the brake fluid pressure (braking force) retained at B system, the inertial force and the rolling resistance of the vehicle, and the like. Because brake fluid pressures at both systems are not released simultaneously, the driving wheels do not idle spin on a slippery road surface, viz. the braking force acts as an idle spin restricting force.

After 20 ms the solenoid valve SV(A) being OFF (communicating position), the control unit CU turns off the solenoid valve SV(B) (communicating position) at B system (FIG. 11(b) below) in a time differential manner. Therefore, the brake fluid pressure (braking force) retained at B system is lost.

Because brake fluid pressure is released in a time differential manner, even if engine 1 is automatically stopped, release of the braking force is carried out smoothly. As a result, a smooth start of the vehicle is carried out even on a slippery road surface without arising an idle turn of the driving wheels. Further, the vehicle is prevented from undesired backward displacement on an up slope. The vehicle smoothly accelerates due to the increasing driving force.

The timing at which the solenoid valve SV(A) is switched to OFF (communicating position) occurs when a certain period of time passes after the supply of pressure oil is initiated (SC[ON]) to the starting clutch at CVT 3. The certain time is counted by a creep rising timer. When the certain time has passed, a signal (creep rising signal F_SCDLY) is transmitted to release the brake fluid pressure. As shown in FIG. 7B, the solenoid valve SV(A) is OFF on condition that the brake switch BSW is OFF, and after a certain period of time, the solenoid valve SV(B) is OFF. The reason for determining the creep rising condition by using the timer is that the hydraulic pressure command value to the starting clutch does not correspond to the actual hydraulic pressure value (driving force transmission capacity). This is because hydraulic oil has been discharged from the oil pressure chamber of the starting clutch while engine 1 is stopped.

As shown in FIG. 11(a), a dashed and dotted line extends downward from "Relief pressure" on the line indicating braking force. The dashed and dotted line indicates a situation where the brake fluid pressure is not retained. In this situation, because reduction of the braking force takes place immediately after decreasing the brake pedal load and braking force is quickly lost, a smooth starting operation of the vehicle is not achieved. The dashed and dotted line also indicates returned conditions of the brake pedal BP.

Further, a dashed and dotted line extending downward from F_SCDLY (FIG. 11(a)) on the line indicating braking force indicates a situation where the brake fluid pressure is released simultaneously at both systems in the conventional manner. In this instance, the vehicle may start on a down slope with a sudden impact due to the simultaneous release of the braking force. Further, on a slippery road surface, the driving wheels may idle turn because the driving force is instantly transmitted to the road surface.

Time Chart for Control without Automatic Engine Stop Operation

Figure 12:
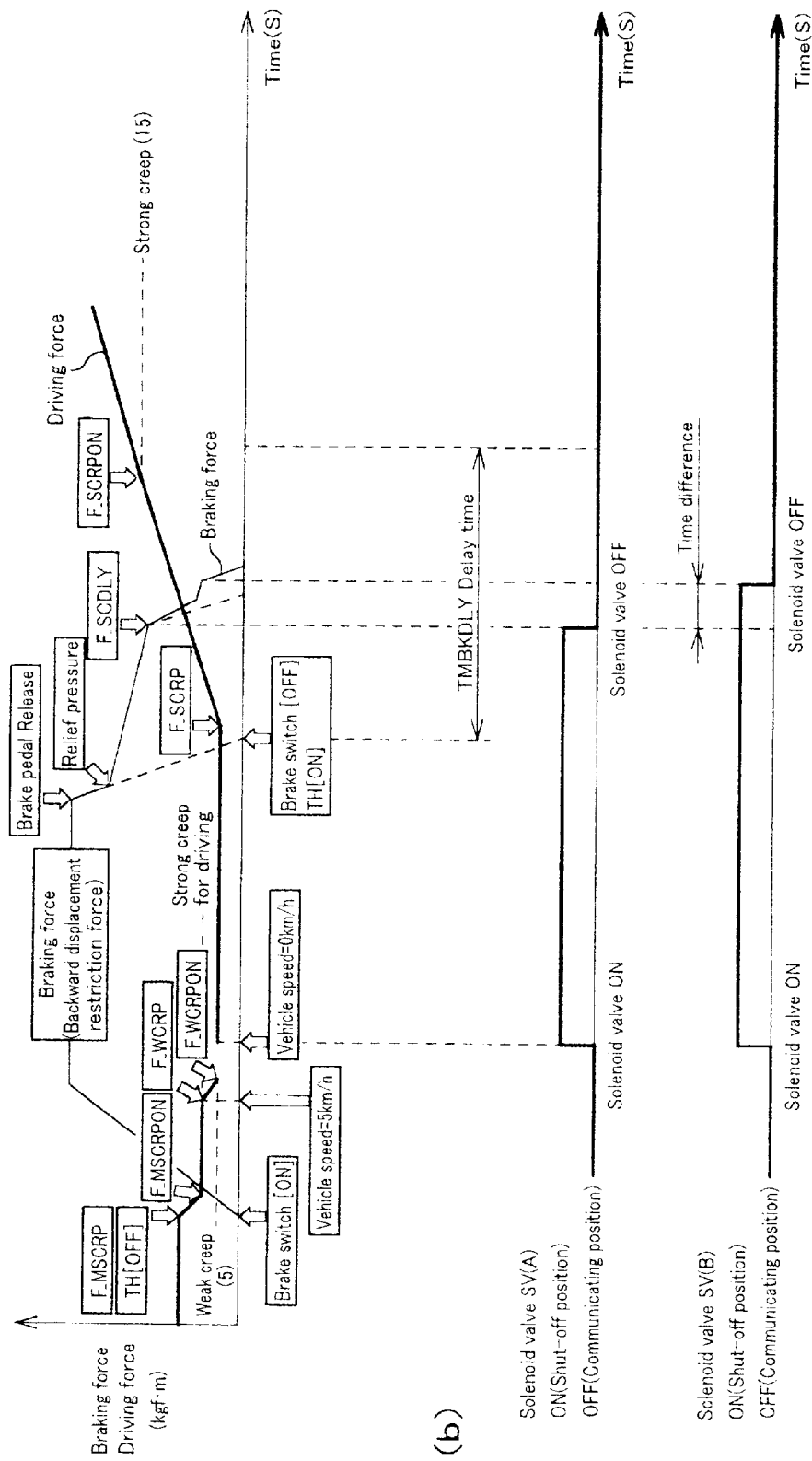
FIG. 12 is a time chart for the control of the vehicle provided with a braking apparatus according to the present invention, in which the engine is not automatically stopped. Here, (a) indicates the relationship (increase or decrease) between driving force and braking force, and (b) indicates the conditions (ON/OFF) of solenoid valves.

With reference to FIG. 12, control of the vehicle will be described. The vehicle having the above system is operated in the order of braking, stopping and starting. In this operation, the driving force is decreased from the strong creep condition for driving to the weak creep condition by the driving force control unit DCU. However, engine 1 is not automatically stopped. The vehicle is supposed to stop on a slippery up slope. The positioning switch PSW and the mode switch MSW of the vehicle are not changed from the D range/D mode. The brake fluid pressure retaining means RU comprises a relief valve RV.

In the time chart of FIG. 12(a), the processes of increasing and decreasing the driving force of the vehicle are shown in the sequence order. A thick line indicates the driving force and a thin line indicates the braking force. In the time chart of FIG. 11(b), ON/OFF (shut-off position/communicating position) of the solenoid valve SV(A) is shown above, and ON/OFF (shut-off position/communicating position) of the solenoid valve SV(B) is shown below.

The operations before switching to the weak creep condition are exactly the same as those shown in "Time Chart for Control with Automatic Engine Stop Operation". Therefore, the explanation thereof will be omitted.

When the vehicle speed falls to 0 km/h, the control unit CU of the braking apparatus BU for vehicle switches the solenoid valves SV(A) and SV(B) to the shut-off position (ON) to retain brake fluid pressure (braking force). Engine 1 is not automatically stopped because the vehicle is not equipped with the driving force stopping unit, otherwise the automatic engine stop condition is not satisfied in the case that the vehicle is equipped with the driving force stopping unit. Because the vehicle is stopped through the weak creep condition, the driver has depressed the brake pedal BP to such an extent that the vehicle does not roll back on a slope. Therefore, the vehicle can be stopped on a slope (backward displacement restriction force) even in the weak creep condition. On an up slope, the vehicle's own weight affects the vehicle (backward displacement force). However, the vehicle does not undesirably roll back on the slope because the total of the driving force in the weak creep condition and the retained braking force is greater than the backward displacement force due to the vehicle's own weight.

The driver then releases the brake pedal BP in order to prepare for restarting the vehicle. If the diver depresses the brake pedal BP more than a preset pressure of the relief valve RV (relief pressure), the relief valve RV actuates upon the driver releasing the brake pedal BP and brake fluid pressure (braking force) immediately decreases to the relief pressure. Providing the relief valve RV ensures a smooth starting operation of the vehicle on a slope, even if the driver depresses the brake pedal BP more than is required.

When the brake fluid pressure within the wheel cylinder WC falls below the relief pressure, the brake fluid pressure gradually decreases by the operation of the solenoid valve SV and the restriction D of the brake fluid pressure retaining means RU. Accordingly, the braking force gradually decreases. Backward displacement of the vehicle is restricted by the braking force being gradually reduced but still retained.

While the brake fluid pressure and the braking force gradually increase, releasing the brake pedal BP turns the brake switch BSW OFF, thereby transmitting a strong creep order (F_SCRP). The driving force is thus increasing.

Unlike automatically stopping engine 1, hydraulic oil has not been discharged from the oil pressure chamber of the starting clutch at CVT 3. Therefore, the hydraulic pressure command value to the starting clutch corresponds to the actual hydraulic pressure value; hence the driving force increases to the strong creep condition (F_SCRPON) in accordance with the hydraulic pressure command value.

The control unit CU of the braking apparatus BU for vehicles firstly turns off the solenoid valve SV(A) (communicating position) at A system to release the brake fluid pressure (FIG. 12(b) above) during the process of increasing the driving force to the strong creep condition (F_SCDLY). With this operation, the brake fluid pressure (braking force) retained at A system is lost, and the braking force acting on the vehicle decreases to almost a half extent. At this point of time, backward displacement of the vehicle is restricted by the brake fluid pressure (braking force) retained at B system, the inertial force and the rolling resistance of the vehicle, and the like. Because brake fluid pressures at both systems are not released simultaneously, the driving wheels do not idle spin on a slippery road surface, viz. the braking force acts as an idle spin restricting force.

After 20 ms the solenoid valve SV(A) being OFF (communicating position), the control unit CU turns off the solenoid valve SV(B) (communicating position) at B system (FIG. 12(b) below) in a time differential manner. Therefore, the brake fluid pressure (braking force) retained at B system is lost.

Because brake fluid pressure is released in a time differential manner, even if engine 1 is not automatically stopped, release of the braking force is carried out smoothly. As a result, a smooth start of the vehicle is carried out even on a slippery road surface without arising an idle turn of the driving wheels. Further, the vehicle is prevented from undesired backward displacement on an up slope. The vehicle smoothly accelerates due to the increasing driving force.

Unlike the control without automatic engine stop operation, the timing at which the solenoid valve SV(A) is switched to OFF (communicating position) occurs when the hydraulic pressure command value—it is transmitted to the linear solenoid valve, which controls hydraulic pressure for the engaging force of the starting clutch—has been increasing substantially to a value halfway between the weak creep and the strong creep, in the process of switching from the weak creep condition to the strong creep condition. When the time has come, a signal (creep rising signal F_SCDLY) is transmitted to release the brake fluid pressure. As shown in FIG. 7B, the solenoid valve SV(A) is OFF on condition that the brake switch BSW is OFF, and after a certain period of time, the solenoid valve SV(B) is OFF. The reason for releasing the brake fluid pressure based on the hydraulic pressure command value is that the hydraulic pressure command value to the starting clutch corresponds to the actual hydraulic pressure value (driving force transmission capacity) because engine 1 does not stop.

As shown in FIG. 12(a), a dashed and dotted line extends downward from "Relief pressure" on the line indicating braking force. The dashed and dotted line indicates a situation where the brake fluid pressure is not retained. In this situation, because reduction of the braking force takes place immediately after decreasing the brake pedal load and braking force is quickly lost, a smooth starting operation of the vehicle is not achieved. The dashed and dotted line also indicates returned conditions of the brake pedal BP.

Further, a dashed and dotted line extending downward from F_SCDLY (FIG. 12 (a)) on the line indicating braking force indicates a situation where the brake fluid pressure is released simultaneously at both systems in the conventional manner. In this instance, the vehicle may start on a down slope with a sudden impact due to the simultaneous release of the braking force. Further, on a slippery road surface, the driving wheels may idle turn because the driving force is instantly transmitted to the road surface.

While the invention has been described in detail and with reference to specific embodiments thereof, it will be apparent to one skilled in the art that various changes and modifications can be made therein without departing from the spirit and scope thereof.

For example, likewise an antilock braking system (ABS), in order to separately retain the brake fluid pressure at each wheel cylinder, a solenoid valve as brake fluid pressure retaining means may be provided in a close relation from the branch point of the brake fluid pressure passage to the wheel cylinder. And the retained brake fluid pressure is released at each wheel cylinder (at the respective four wheel cylinders in case of four-wheel vehicles) in a time differential manner. This enables a more smooth release of the retained brake fluid pressure.

The brake fluid pressure retaining means may be a servo valve or a passage-switching valve to be operated by electromagnetic means.

As shown in FIGS. 7A and 7B, conditions for releasing the retained brake fluid pressure are separated. However, the conditions of FIG. 7A may be changed so that the release of the brake fluid pressure is carried out in a time differential manner. This is advantageous because the driver does not experience any awkward feels upon releasing the brake fluid pressure.

In the aforementioned time chart, the creep rising is determined as a half value between the weak creep condition and the strong creep condition. However, the creep rising may be determined when the strong creep condition is achieved. This is because a sudden impact or an idle spin of the driving wheels does not occur at the start of the vehicle because the release of the braking force is carried out smoothly in the braking apparatus according to the present invention. On the contrary, the creep rising may be determined between the weak creep condition and the strong creep condition and closer to the weak creep condition (including the weak creep condition). This is because the vehicle does not undesirably roll back on a slope upon starting because the release of the braking force is carried out smoothly in the braking apparatus according to the present invention.

What is claimed is:

1. A braking apparatus for vehicles, comprising:
   a plurality of brake fluid pressure passages;
   a plurality of wheel cylinders, each wheel cylinder being connected to one of the brake fluid pressure passages; and
   a plurality of brake fluid pressure retaining means,
   wherein each of the brake fluid pressure passages is provided with one of the brake fluid pressure retaining means for retaining brake fluid pressure within the wheel cylinder connected to the brake fluid pressure passage after a depression of a brake pedal is released and for releasing the retained brake fluid pressure in response to an increase of a starting driving force of the vehicle, wherein the release of the retained brake fluid pressure is carried out in a time differential manner, which is based on a predetermined time difference, at each brake fluid pressure retaining means.

2. A braking apparatus for vehicles according to claim 1, wherein said brake fluid pressure retaining means is a solenoid valve.

3. A braking apparatus for vehicles according to claim 1, wherein said brake fluid pressure retaining means is a servo valve.

4. A braking apparatus for vehicles according to claim 1, wherein said brake fluid pressure retaining means is an electromagnetically operated passage-switching valve.

5. A braking apparatus for vehicles according to claim 1, wherein said brake fluid pressure retaining means comprises a solenoid valve and a relief valve disposed in an auxiliary pressure passage that is parallel to said solenoid valve.

6. A braking apparatus for vehicles according to claim 5, wherein the release of the retained brake fluid pressure in a time differential manner comprises releasing brake fluid pressure of a first one of said plurality of fluid pressure retaining means and after a time delay, releasing brake fluid pressure of a second one of said plurality of fluid pressure retaining means.

7. A braking apparatus for vehicles according to claim 1, wherein a first one of said plurality of brake fluid pressure retaining means differs from a structure of a second one of said plurality of brake fluid pressure retaining means, said first brake fluid pressure retaining means operable to release pressure more rapidly than said second brake fluid pressure retaining means, and wherein release of the retained fluid pressure in a time differential manner comprises releasing said first and second brake fluid pressure retaining means at substantially the same time.

8. A braking apparatus according to claim 6, wherein the first brake fluid pressure retaining means responds to a change in pressure oil of a transmission system of the vehicle to detect the increase of the starting driving force of the vehicle and to begin release of retained brake fluid pressure.

9. A braking apparatus according to claim 7, wherein the first brake fluid pressure retaining means responds to a change in pressure oil of a transmission system of the vehicle to detect the increase of the starting driving force of the vehicle and to begin release of retained brake fluid pressure.

10. A braking apparatus according to claim 8, wherein the first brake fluid pressure retaining means releases retained brake fluid pressure after a predetermined delay after detection of the change in pressure oil.

11. A braking apparatus according to claim 9, wherein the first brake fluid pressure retaining means releases retained brake fluid pressure after a predetermined delay after detection of the change in pressure oil.

12. A braking fluid pressure retention device comprising:
   a first valve system operably connected to a first brake fluid passage,
   a second valve system operably connected to a second brake fluid passage,
   a controller for the first and the second valve systems responsive to a drive force condition, the controller controlling the first and the second valve systems to retain a brake fluid pressure in the first and the second brake fluid passages after a depression pressure on a brake pedal is released and controlling the first and the second valve systems to release the retained brake fluid pressure in a time differential manner, which is based on a predetermined time difference.

13. A braking fluid pressure retention device of claim 12, wherein the first valve system is controlled to release the retained pressure after a delay when the second valve system is controlled to release the retained pressure.

14. A braking fluid pressure retention device of claim 12, wherein a structure of the first valve system differs from a structure of the second valve system, said first valve system releasing brake fluid pressure more slowly than said second valve system, and wherein the controller causes the first and second valve systems to release brake fluid pressure at substantially the same time.

15. A braking fluid pressure retention device of claim 13, wherein the controller responds to a change in pressure oil of a transmission system as the drive force condition and controls the first valve system to begin release of retained brake fluid pressure based on the change in pressure oil.

16. A braking fluid pressure retention device of claim 14, wherein the controller responds to a change in pressure oil of a transmission system as the drive force condition and controls the first valve system to begin release of retained brake fluid pressure based on the change in pressure oil.

17. The braking fluid pressure retention device of claim 15, wherein the controller controls the first valve to begin release of retained brake fluid pressure after a delay after detecting the change in pressure oil.

18. The braking fluid pressure retention device of claim 16, wherein the controller controls the first valve to begin release of retained brake fluid pressure after a delay after detecting the change in pressure oil.

19. The braking fluid pressure retention device of claim 13, wherein the first and second valve systems include the same valve type comprising one of: a solenoid valve, a servo valve, and an electromagnetically operated passage switching valve.

20. The braking fluid pressure retention device of claim 14, wherein the first valve system includes a servo valve and the second valve system includes a solenoid valve.

* * * * *